US006785893B2

(12) United States Patent
Morris et al.

(10) Patent No.: US 6,785,893 B2
(45) Date of Patent: Aug. 31, 2004

(54) OPERATING SYSTEM EVENT TRACKER HAVING SEPARATE STORAGE FOR INTERRUPT AND NON-INTERRUPT EVENTS AND FLUSHING THE THIRD MEMORY WHEN TIMEOUT AND MEMORY FULL OCCUR

(75) Inventors: Larry A. Morris, Kirkland, WA (US); Michael J. Thomson, Bellevue, WA (US); John R. Eldridge, Bellevue, WA (US); Susan A. Dey, Seattle, WA (US); David M. Sauntry, Redmond, WA (US); Jonathan M. Tanner, Bothell, WA (US); Marc Shepard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 09/726,907

(22) Filed: Nov. 30, 2000

(65) Prior Publication Data

US 2002/0065948 A1 May 30, 2002

(51) Int. Cl.$^7$ ................................................ G06F 9/46
(52) U.S. Cl. ...................... 719/318; 710/260; 710/263
(58) Field of Search ................................. 709/100–108, 709/318–32; 710/1–74; 714/1–57; 717/124–133; 719/318

(56) References Cited

U.S. PATENT DOCUMENTS 5,872,909 A * 2/1999 Wilner et al. ................. 714/38
5,884,082 A * 3/1999 Seidel et al.
5,920,719 A * 7/1999 Sutton et al.

OTHER PUBLICATIONS

Rodgers JB, et al., "An In–Situ Non–Invasive Performance Tuning Tool for Multi–Threaded Linux on Symmetric Multiprocessing Pentium Workstations", Software–Practice & Experience, vol. 29, No. 9, 1999, 775–792.
Halang, W.A., et al.; "High Accuracy Concurrent Event Processing in Hard Real–Time Systems", Real–Time Systems, vol. 12, No. 1, Jan. 1997, p. 77–94.

* cited by examiner

Primary Examiner—Meng-Al T. An
Assistant Examiner—Charles Anya
(74) Attorney, Agent, or Firm—Amin & Turocy, LLP

(57) ABSTRACT

A system and method for logging events processed by an operating system is provided. The events logged can include interrupt and non-interrupt events, and can include user-defined events. Information concerning the interrupt events is initially written, during event handling time, into a first buffer while information concerning non-interrupt events is initially written, during event handling time, into a second buffer. Information from the two buffers is then written to a third buffer not during event handling time. Separating the interrupt event buffer from the non-interrupt event buffer rather than having one buffer, and writing relatively small amounts of data during event handling time to memory, rather than transporting data to slower non-memory mapped devices allows the event logger to be less intrusive and facilitates greater accuracy in event logging. Data stored in the third buffer can be accessed by a viewing component, which facilitates displaying data in a manner useful to diagnose operating systems.

51 Claims, 17 Drawing Sheets

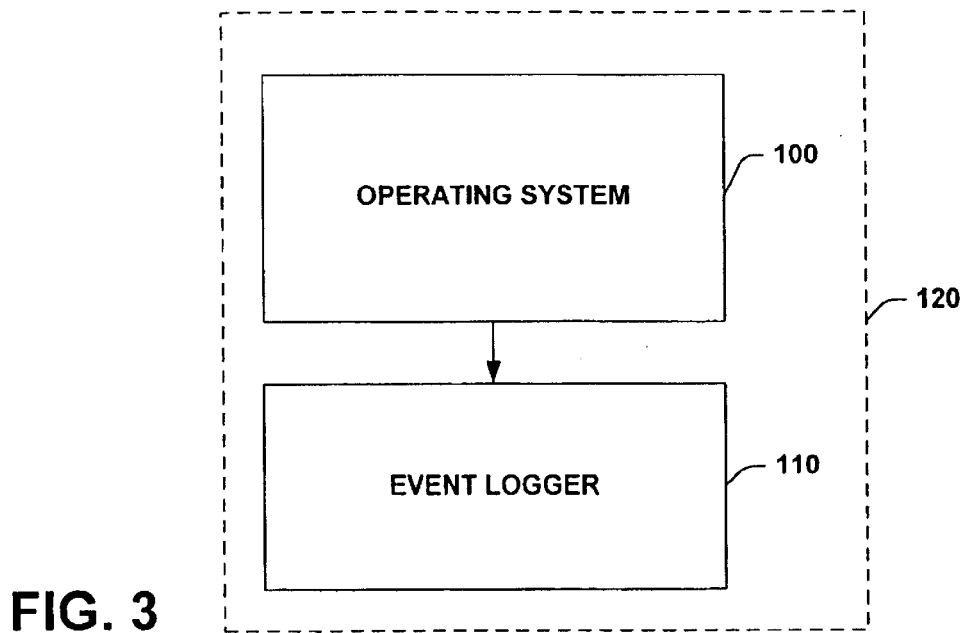
FIG. 3
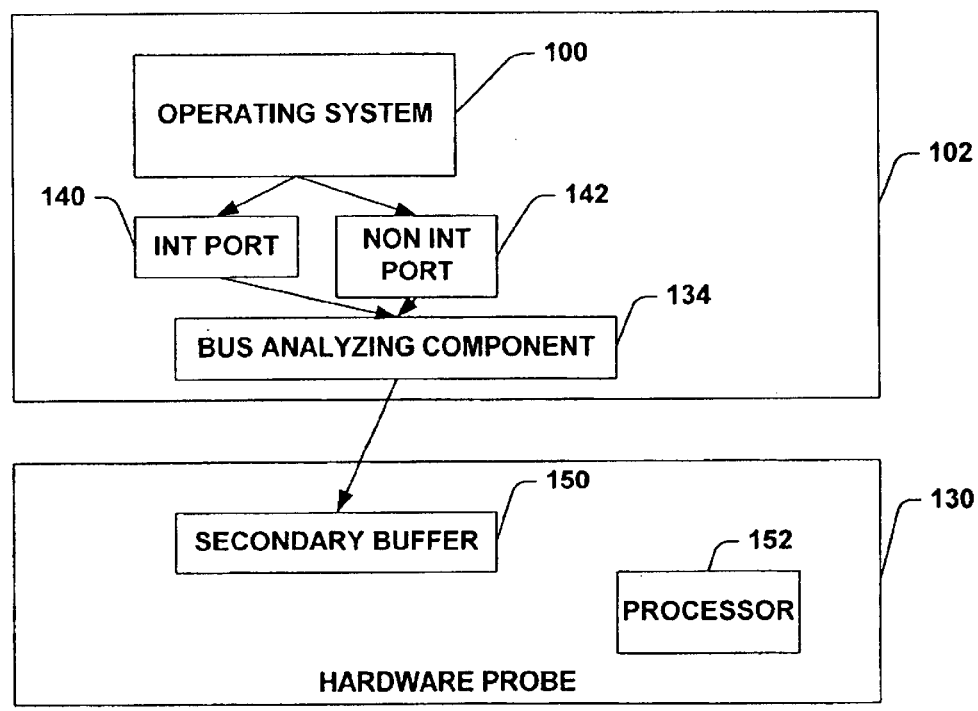

OPERATING SYSTEM EVENT TRACKER HAVING SEPARATE STORAGE FOR INTERRUPT AND NON-INTERRUPT EVENTS AND FLUSHING THE THIRD MEMORY WHEN TIMEOUT AND MEMORY FULL OCCUR

TECHNICAL FIELD

The present invention relates generally to computer programming and more particularly to a system and method for tracking events handled by an operating system kernel.

BACKGROUND OF THE INVENTION

As operating systems have become more sophisticated, and as the environments with which operating systems operate have become more complex, it has become important to monitor the actions taken by an operating system in response to events the operating system is tasked to handle. In particular, visibility into the internal workings of an operating system kernel can be important to activities including, but not limited to, developing, debugging, and/or diagnosing an operating system. For example, tracking the number and type of events that an operating system handles can be important to diagnosing system problems, bottlenecks, malfunctioning equipment and/or component, and capacity problems.

Conventionally, monitoring operating system events has been difficult to achieve. Even if possible to log events handled by an operating system, such logging negatively impacted the ability of the operating system to handle events. For example, when an operating system experienced a problem, support personnel may have considered monitoring the events handled by the operating system to diagnose the problem. But the processing required to log an event may have taken more time to perform than handling the event, and thus the operating system could not be monitored under conditions that produced the problem, thus reducing the relevance of the monitoring. Similarly, when testing an operating system, test conditions that stress the operating system to a point where bugs appear can overwhelm a conventional monitor, and events may not be logged or requests may not be handled and thus the problem may remain undiagnosed. Further, contemporaneously logging interrupt events and non-interrupt events frequently lead to interrupt data interfering with non-interrupt data, and thus accurate monitoring was difficult. Thus, the monitoring may not have been performed and operating system improvements may not have been achieved.

Even if operating system monitoring is performed, it can be difficult to understand complex interactions between entities including, but not limited to, threads, processes, mutexes, locks, events, device drivers and applications. The value of operating system monitoring can be limited if the data produced during such monitoring is difficult to understand.

Thus there remains a need for a minimally intrusive system and method to accurately monitor events handled by an operating system, where the data produced by such monitoring is viewable and facilitates understanding the running of the operating system.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for logging events processed by an operating system. The events can include both interrupt and non-interrupt data. When an event is logged, the present invention stores data associated with interrupts in an interrupt buffer and stores data associated with non-interrupt events in a non-interrupt buffer. By writing small amounts of data to separate memories and by not attempting to transport data concerning the event to other processes (e.g. data viewer, disk log, network) during the event handling process, the logging of the events is less intrusive, and less likely to corrupt nearly simultaneous events, thus mitigating problems associated with conventional monitoring systems.

Both the interrupt buffer and the non-interrupt buffer can be flushed to a secondary buffer during non-event handling time. The interrupt buffer can be flushed upon completion of the interrupt handling process and the non-interrupt buffer can be flushed upon completion of the execution of the event-handler and/or upon the non-interrupt buffer becoming substantially full. One or more processes (e.g. a viewer) can access the secondary buffer. The secondary buffer can also be flushed to one or more devices and/or processes (e.g. a viewer, data communication devices, disk) when the secondary buffer becomes substantially full and/or when a timeout condition occurs.

In one aspect of the present invention, the interrupt buffer, the non-interrupt buffer and the secondary buffer are located in memory associated with the computer running the operating system being monitored. In an alternative aspect of the present invention, the interrupt buffer, the non-interrupt buffer and the secondary buffer are located in memory associated with a separate hardware probe. When the buffers are located in memory associated with computer running the operating system being monitored, flushing the buffers may be accomplished under software control. But when the buffers are located in memory associated with a separate hardware probe, then flushing the buffers may be accomplished under hardware and/or software control.

By logging operating system kernel events, visibility into the internals of the operating system kernel is achieved. Such visibility facilitates actions including, but not limited to, debugging, programming and maintaining operating systems, hardware components, software components and/or applications. By employing the triple buffering method described above, acquiring such visibility is less intrusive to the operating system being monitored. Initially storing the data associated with interrupt events and the data associated with non-interrupt events in separate buffers mitigates problems associated with interrupt data corrupting non-interrupt data. Subsequently merging the interrupt data and the non-interrupt data during non-event handling time reduces the impact of the monitor on the operating system event handling performance and facilitates chronologically ordering the interrupt data and non-interrupt data in the secondary buffer. To facilitate such chronological ordering, when the flushing of the buffers is under software control, a time stamp can be associated with events as they are written to the buffers. The time stamp can then be used to arrange events in chronological order, and to ascertain the amount of time spent processing one or more events.

Monitoring an operating system may be undertaken for many reasons. For example, an operating system can be monitored to determine the effect of adding a new piece of hardware, the effect of adding a new software component, and/or to determine the amount of operating system resources being allocated to handle certain events. Thus, a plurality of events can be logged by the present invention to facilitate customizing monitoring an operating system. A user interface provides means for an administrator to select events that are to be logged by the monitor. An Application Programming Interface (API) similarly provides means for processes to select events that are to be logged by the monitor. Since users may be interested in events not defined by the present invention, users may define events that are to be logged, and thus the present invention provides means for defining such events, which can then be selected via the UI or API.

The value of monitoring an operating system can be increased if the data produced by such monitoring is viewable in a manner that facilitates understanding the running of the operating system. Thus, the present invention includes a component and method for runtime display of monitoring data. Such a runtime display of monitoring data facilitates visualizing time based thread interactions, and system events associated with the interacting threads. The runtime display facilitates viewing items including, but not limited to, process states, thread states, process events, thread events, process switching, thread switching, events, changing states of semaphores, changing states of mutexs, entering/leaving a critical section, and the occurrence of user defined events. Since numerous items can be viewed, the present invention provides for filtering the events that can be viewed. For example, an administrator may desire to view events associated with entering/leaving a critical section, and may not desire to view other events. The ability to view such events facilitates diagnosing problems associated with programs including, but not limited to, operating systems, device drivers and/or applications. Problems whose diagnosis can be facilitated include, but are not limited to, deadlocks, and missed real time deadlines. The ability to filter events to be viewed facilitates viewing a smaller and/or more focused set of data, which can improve the ability to diagnose such problems.

Since an operating system can be monitored for different reasons, in an exemplary aspect of the present invention, the component and method for runtime display of monitoring data includes a User Interface (UI) to facilitate searching the monitoring data for items including, but not limited to, processes, threads, process states, thread states, process events, thread events and categories of events. For example, a first person examining monitoring data may desire to see a category of events, (e.g. interrupt events) associated with all processes, while a second person examining monitoring data may desire to see data associated with events associated with a particular process.

An operating system can be monitored for different reasons at different times. Thus, in an exemplary aspect of the present invention, the component and method for runtime display of monitoring can be run in one of at least three different modes: a real time mode, a system log of a previous run mode and a limited buffer mode. The different modes facilitate monitoring an operating system for different reasons at different times.

In accordance with an aspect of the present invention, a system for logging operating system events is provided, the system comprising: a first memory for storing first data associated with an interrupt event; a second memory for storing second data associated with a non-interrupt event; one or more components for storing data in the first memory and second memory; one or more components for moving the first data from the first memory to a third memory and the second data from the second memory to the third memory; and a first flushing component for flushing data from the third memory upon at least one of the third memory becoming substantially full and a timeout condition occurring.

Another aspect of the present invention provides a system for logging operating system events is provided, the system comprising: a first memory for storing first data associated with an interrupt event; a second memory for storing second data associated with a non-interrupt event; one or more components for storing data in the first memory and second memory; one or more components for moving the first data from the first memory to a third memory and the second data from the second memory to the third memory; and a first flushing component for flushing data from the third memory upon at least one of the third memory becoming substantially full and a timeout condition occurring, wherein at least one of the first data in the first memory and the second data in the second memory includes a time stamp associated with when the event occurred.

Yet another aspect of the present invention provides a system for logging operating system events is provided, the system comprising: a first memory for storing first data associated with an interrupt event; a second memory for storing second data associated with a non-interrupt event; one or more components for storing data in the first memory and second memory; one or more components for moving the first data from the first memory to a third memory and the second data from the second memory to the third memory; and a first flushing component for flushing data from the third memory upon at least one of the third memory becoming substantially full and a timeout condition occurring, wherein the non-interrupt events include user-defined events.

Yet another aspect of the present invention provides a user interface, the user interface operable to facilitate selecting one or more events to be logged.

Still yet another aspect of the present invention provides an Application Programming Interface (API) operable to facilitate selecting one or more events to be logged.

Another aspect of the present invention provides a method for logging operating system kernel events, comprising: storing interrupt data associated with interrupt events in an interrupt buffer; storing non-interrupt data associated with non-interrupt events in a non-interrupt buffer; flushing the interrupt data to a secondary buffer; and flushing the non-interrupt data to the secondary buffer.

Yet another aspect of the present invention provides a method for logging operating system kernel events, comprising: storing interrupt data associated with interrupt events in an interrupt buffer; storing non-interrupt data associated with non-interrupt events in a non-interrupt buffer; flushing the interrupt data to a secondary buffer; and flushing the non-interrupt data to the secondary buffer, wherein the interrupt and non-interrupt events to log are determined by at least one of choices made in response to a User Interface (UI) and one or more calls made to an Application Programming Interface (API).

Yet another aspect of the present invention provides a method for logging operating system kernel events, comprising: storing interrupt data associated with interrupt events in an interrupt buffer; storing non-interrupt data associated with non-interrupt events in a non-interrupt buffer; flushing the interrupt data to a secondary buffer; and flushing the non-interrupt data to the secondary buffer, wherein flushing the non-interrupt data to the secondary buffer further comprises re-flushing the non-interrupt data to the secondary buffer upon a determination that the flushing did not complete.

Still yet another aspect of the present invention provides a computer readable medium storing computer executable components of a system for triple buffering information associated with events handled by an operating system kernel, comprising: one or more computer executable components for storing first data associated with interrupt events in a first memory; one or more computer executable components for storing second data associated with non-interrupt events in a second memory; one or more components for moving the first data from the first memory to the third memory and the second data from the second memory to a third memory; and a flushing component for flushing data from the third memory upon at least one of the third memory becoming substantially full and a timeout condition occurring, the flushing not occurring during interrupt handling time.

Still yet another aspect of the present invention provides a computer readable medium storing computer executable components operable to execute a method for logging operating system kernel events, the method comprising: storing interrupt data associated with interrupt events in an interrupt buffer; storing non-interrupt data associated with non-interrupt events in a non-interrupt buffer; flushing the interrupt data to a secondary buffer, the flushing not occurring during interrupt handling time; and flushing the non-interrupt data to the secondary buffer, the flushing not occurring during interrupt handling time.

Another aspect of the present invention provides a data packet adapted to be transmitted from a first system to a second system, the data packet comprising data used in logging operating system events.

Another aspect of the present invention provides a system for logging operating system kernel events, comprising: means for logging interrupt events to an interrupt buffer; means for logging non-interrupt events to a non-interrupt buffer; means for copying data in the interrupt buffer to a secondary buffer; and means for copying data in the non-interrupt buffer to the secondary buffer.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 3 illustrates aspects of two example event logging systems;

DETAILED DESCRIPTION

Figure 1:
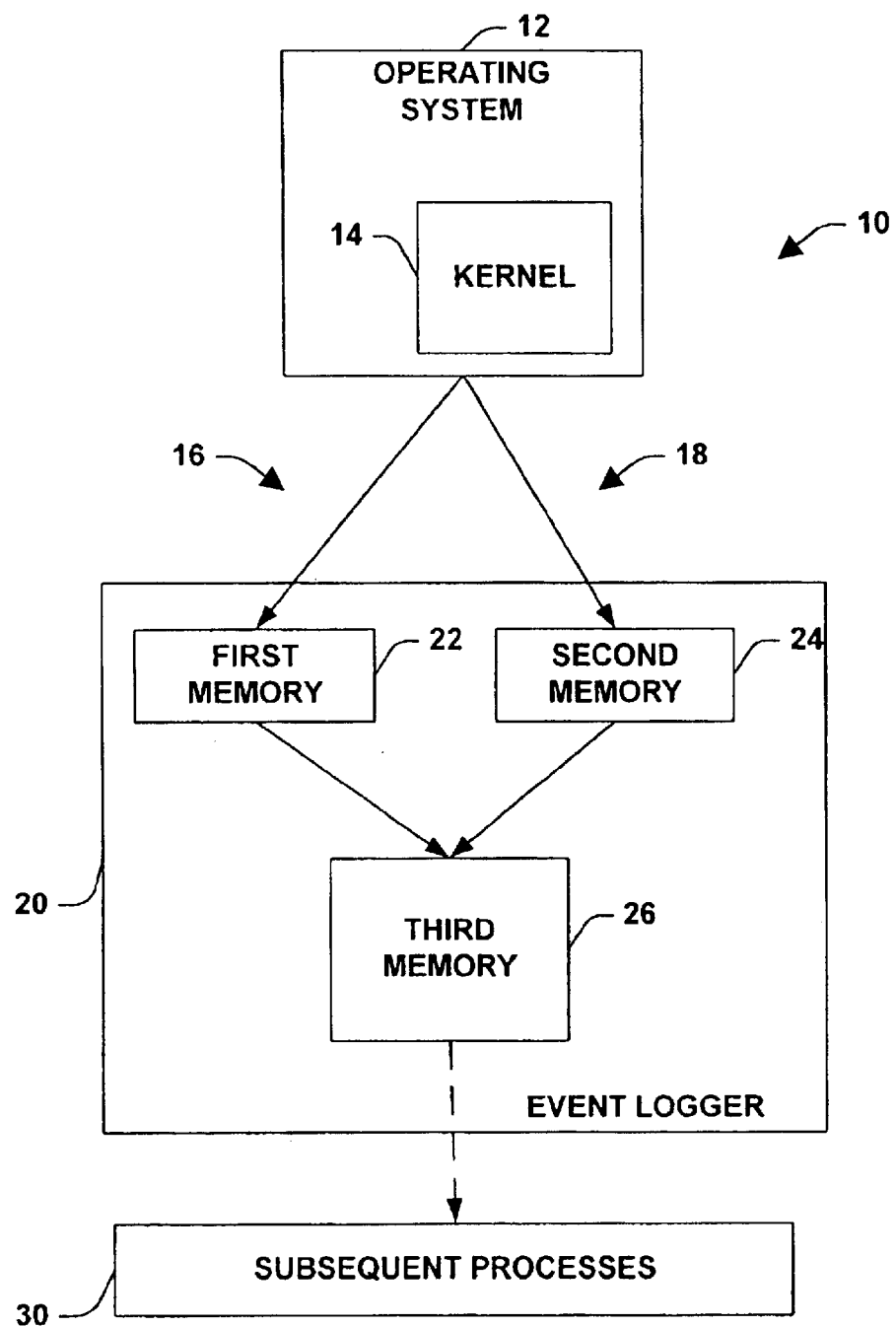
FIG. 1 is schematic block diagram illustrating a system for triple buffering information concerning events handled by an operating system kernel, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be components.

Turning initially to FIG. 1, a system 10 for triple buffering information concerning events handled by an operating system 12 and/or an operating system kernel 14 is illustrated. An operating system kernel 14 can be tasked to handle interrupt events and/or non-interrupt events. Information concerning events handled by the kernel 14 can be logged by an event logger 20. The event logger 20 includes a first memory 22, a second memory 24 and a third memory 26 that are employed in triple buffering information concerning events handled by the kernel 14. The first memory 22, the second memory 24 and the third memory 26 can be of any suitable memory type, including, but not limited to, cache memory, stack memory, and/or random access memory.

During interrupt event handling, a writing 16 of information concerning an interrupt event can be made to the first memory 22. Interrupt events can include, but are not limited to, memory, scheduling, communications and device interrupts. The writing 16 can be of variable length, but is intended to be of a size minimally intrusive to the event handling. For example, if the interrupt event handling will consume X processing cycles, X being an integer, then in one example aspect of the present invention, the writing 16 should consume at most Y processing cycles, Y being an integer less than X.

With continuing reference to FIG. 1, a writing 18 of information concerning non-interrupt events can be made to the second memory 24. The non-interrupt events can include, but are not limited to, reads/writes from a designated memory area, database queries and Web page accesses. The writing 18 can be of variable length, but is intended to be of a size minimally intrusive to the event handling. For example, if the non-interrupt event handling will consume M processing cycles, M being an integer, then in one example aspect of the present invention, the writing 18 should consume at most N processing cycles, N being an integer less than M. By writing relatively small amounts of data to memory, rather than attempting to transport data to subsequent processes and/or devices, the event logging of the present invention is less intrusive than conventional event logging systems, and thus performance problems associated with such conventional event logging systems are mitigated.

Since the non-interrupt event handling can be interrupted by interrupt handling, separating writing interrupt information associated with interrupt events from writing non-interrupt information associated with non-interrupt events facilitates accurate logging of both interrupt and non-interrupt events, thus mitigating corruption problems associated with conventional event logging systems. Thus, the first memory 22 receives interrupt information while the second memory 24 receives non-interrupt information facilitating more accurate logging than can be achieved via conventional event logging systems.

With further reference to FIG. 1, the data stored in the first memory 22 and the data stored in the second memory 24 can be written to the third memory 26. In one example aspect of the present invention, writing the interrupt event data stored in the first memory 22 occurs when event handling associated with the interrupt for which interrupt event data was stored in the first memory 22 completes. By moving the interrupt event data stored in the first memory 22 to the third memory 26 upon completion of interrupt event handling, the interrupt event data can be arranged in chronological order in the third memory 26. In one example aspect of the present invention, writing the non-interrupt event data stored in the second memory 24 occurs either when the event handling associated with the event for which the non-interrupt event data was stored in the second memory 24 completes and/or the second memory 24 becomes substantially full.

The data located in the third memory 26 can thus include both data associated with interrupt events and non-interrupt events. The data located in the third memory 26 can be made available to one or more subsequent processes 30 (e.g. data viewing, data communications, data logging processes). In one example aspect of the present invention, the data located in the third memory 26 can be flushed when the third memory 26 becomes substantially full and/or upon the occurrence of a timeout condition. For example, if the third memory 26 reaches a pre-determined threshold of fullness, then the third memory 26 may be flushed. Such flushing can include, but is not limited to, resetting read and/or write pointers associated with the third memory 26, overwriting the third memory 26, and transporting the contents of the third memory 26 to other components (e.g. data communications devices, processes, disk). By way of further illustration, if a timeout condition occurs, (e.g. a pre-determined amount of time has passed since the third memory 26 has been flushed) then the third memory 26 can be flushed by methods including, but not limited to, resetting read and/or write pointers associated with the third memory 26, overwriting the third memory 26 and transporting the contents of the third memory 26 to other components. It is to be appreciated by one skilled in the art that although two methods are described for flushing the third memory 26, that any suitable flushing method can be employed to flush the third memory 26.

It is to be further appreciated by one skilled in the art that although the subsequent processes 30 are illustrated receiving data from the third memory 26, that the subsequent processes 30 may access the third memory 26 without the third memory 26 being written to the subsequent processes 30. For example, the third memory 26 may have one or more processes writing the data from the first memory 22 to the third memory 26 and one or more processes writing the data from the second memory 24 to the third memory 26 contemporaneously with one or more subsequent processes 30 reading data from the third memory 26. Techniques well known in the art, for example time-sharing, can be employed to provide such contemporaneous writing and reading from the third memory 26.

Figure 2:
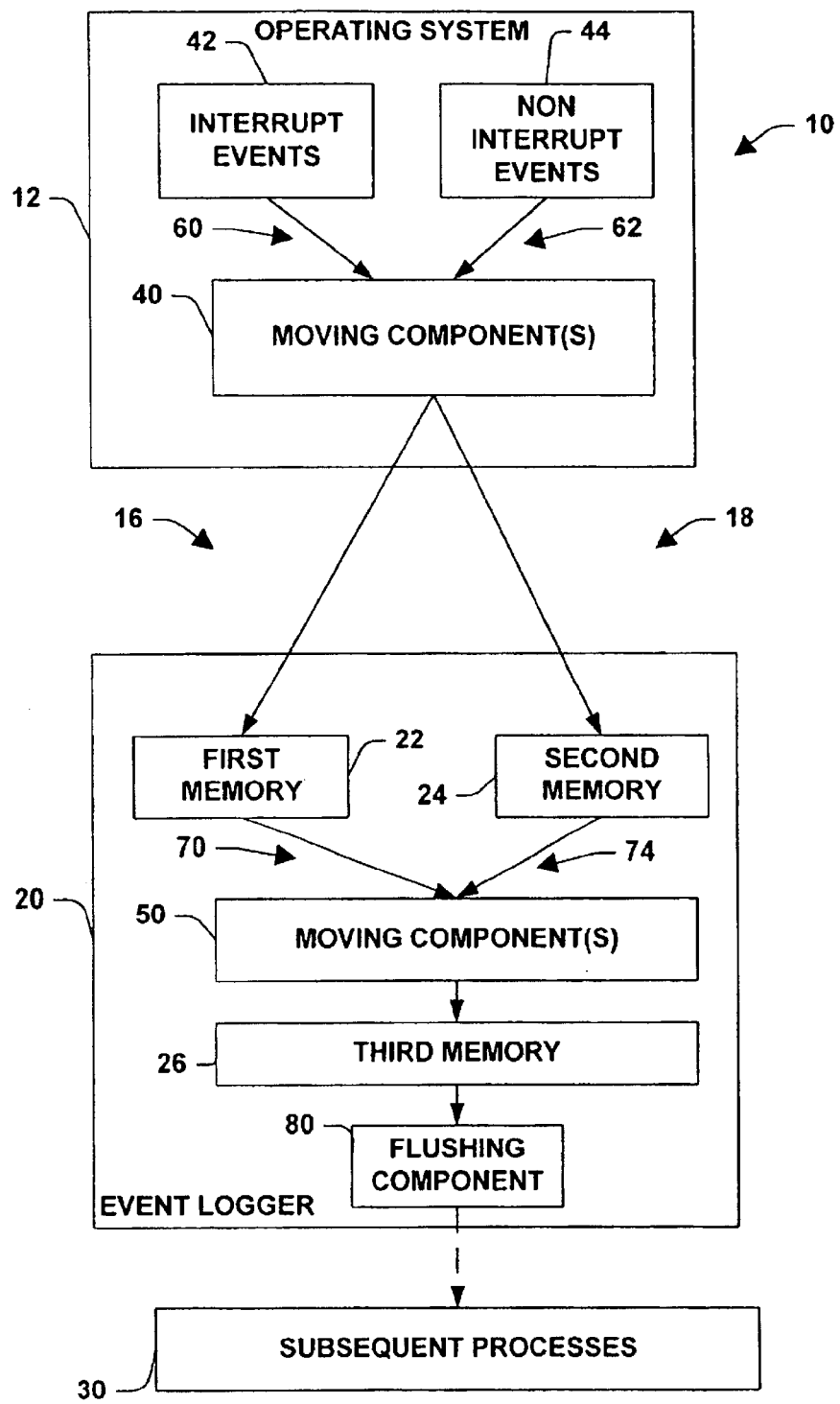
FIG. 2 is a schematic block diagram further illustrating a system for triple buffering information concerning events handled by an operating system kernel, in accordance with an aspect of the present invention.

Turning now to FIG. 2, the system 10 for triple buffering information concerning events handled by an operating system 12 and/or an operating system kernel 14 (FIG. 1) is further illustrated. The operating system 12 can be tasked with handling interrupt events 42 and non-interrupt events 44. Interrupt data 60 associated with the interrupt events 42 can be moved from the operating system 12 to the first memory 22 in the event logger 20 by one or more first moving components 40. Similarly, non-interrupt data 62 associated with the non-interrupt events 44 can be moved from the operating system 12 to the second memory 24 in the event logger 20 by the one or more first moving components 40. It is to be appreciated by one skilled in the art that the one or more first moving components 40 can include, but are not limited to, hardware, software, a combination of hardware and software, and/or software in execution. In one exemplary aspect of the present invention, the first moving components 40 can include separate components for moving the interrupt data 60 and the non-interrupt data 62, while in another exemplary aspect, the first moving components 40 can include components that move both the interrupt data 60 and the non-interrupt data 62. While a plurality of first moving components 40 are described, it is to be appreciated by one skilled in the art that any suitable number of components, including a single component, may be employed in association with the present invention.

The first moving components 40 can generate the write 16 of the interrupt data 60 and the write 18 of the non-interrupt data 62. Thus, the first moving components 40 are associated with providing the interrupt data 60 to the first memory 22 and with providing the non-interrupt data 62 to the second memory 24.

With further reference to FIG. 2, the event logger 20 can include one or more second moving components 50. It is to be appreciated by one skilled in the art that the one or more second moving components 50 can include, but are not limited to, hardware, software, a combination of hardware and software, and/or software in execution. The second moving components 50 move an interrupt data 70 from the first memory 22 to the third memory 26 and move a non-interrupt data 74 from the second memory 24 to the third memory 26. In an exemplary aspect of the present invention, the second moving components 50 can include separate components for moving the interrupt data 70 and the non-interrupt data 74, while in another exemplary aspect, the second moving components 50 can include components that move both the interrupt data 70 and the non-interrupt data 74. In an example aspect of the present invention, the second moving components 50 move the interrupt data 70 from the first memory 22 to the third memory 26 when the event handling associated with the interrupt event 42 for which interrupt data 60 was written to the first memory 22 is completed. In an example aspect of the present invention, the second moving components 50 move the non-interrupt data 74 from the second memory 24 to the third memory 26 when the event handling associated with the non-interrupt event 44 for which the non-interrupt data 62 was written to the second memory 24 is completed and/or when the second memory 24 becomes substantially full.

The event logger 20 can include a flushing component 80. The flushing component 80 can flush data from the third memory 26. In an example aspect of the present invention, the flushing component 80 can flush the data located in the third memory 26 when the third memory 26 becomes substantially full and/or upon the occurrence of a timeout condition. For example, if the flushing component 80 determines that the third memory 26 has reached a predetermined threshold of fullness, (e.g. 75% full) the flushing component 80 can flush the third memory 26. Such flushing can include, but is not limited to, resetting read and/or write pointers associated with the third memory 26, overwriting the third memory 26, and transporting the contents of the third memory 26 to data communications devices, subsequent processes and/or to disk. By way of further illustration, if a timeout condition occurs, the flushing component 80 can flush the third memory 26. For example, if a predetermined amount of time has passed since the third memory 26 has been flushed (e.g. 100,000 CPU cycles), then the flushing component 80 can flush the third memory 26. It is to be appreciated by one skilled in the art that although two methods are described for the flushing component 80 to flush the third memory 26, that any suitable flushing method can be employed to flush the third memory 26.

Turning now to FIG. 3, two example aspects of the event logging system 10 (FIG. 1) are illustrated. In a first example aspect of the present invention, a system 120 is illustrated. The system 120 includes an operating system 100 to be monitored and an event logger 110. In the first example aspect of the system 10, the operating system 100 and the event logger 110 run on the same physical hardware. For example, a handheld computer can be loaded with the operating system 100 (e.g. Windows CE). The handheld computer can also be loaded with the event logger 110. Thus, the handheld computer is running both the operating system 100 and the event logger 110.

In a second example aspect of the present invention, a system 130 is illustrated. The system 130 can be referred to as a hardware probe. In the system 130, the third memory 26 (FIG. 1) is not located in the physical machine running the operating system 100. Thus, to monitor the operating system 100, a physical connection between the machine running the operating system 100 and the system 130 may be required. Byway of illustration, to monitor the operating system 100, a bus analyzing component 134 operatively connected to the hardware probe 130 may be connected to a first bus on a machine 102 running the operating system 100, the first bus operatively connected to an interrupt data port 140 and a non-interrupt data port 142. The bus analyzing component 134 can capture data associated with interrupt events to from the interrupt data port 140 and data associated with non-interrupt events from the non-interrupt data port 142, the data ports being located in the machine 102 on which the operating system 100 is running. The bus analyzing component 134 may then deposit the interrupt data and the non-interrupt data in a secondary buffer 150.

In an alternative second example aspect of the present invention, the system 130 can include the hardware interrupt data port 140 to receive data associated with interrupt events. Similarly, the system 130 can include the hardware non-interrupt port 142 to receive data associated with non-interrupt events. In this alternative second example aspect of the system 130, data received in the interrupt port 140 and the non-interrupt port 142 can be transported under hardware control to a secondary buffer 150.

The system 130 can contain a processor 152 that moves the data from the first memory 22 (FIG. 1) (e.g. the interrupt port 140) to the third memory 26 (FIG. 1) (e.g. secondary buffer 150) and that moves the data from the second memory 24 (FIG. 1) (e.g. the non-interrupt port 142) to the third memory 26 (FIG. 1) (e.g. secondary buffer 150). Thus, in the example aspect of the present invention illustrated by the system 130, problems associated with processing overhead allocated to the event logging are mitigated, since the processing is not undertaken by the same processor running the operating system 100.

Figure 4:
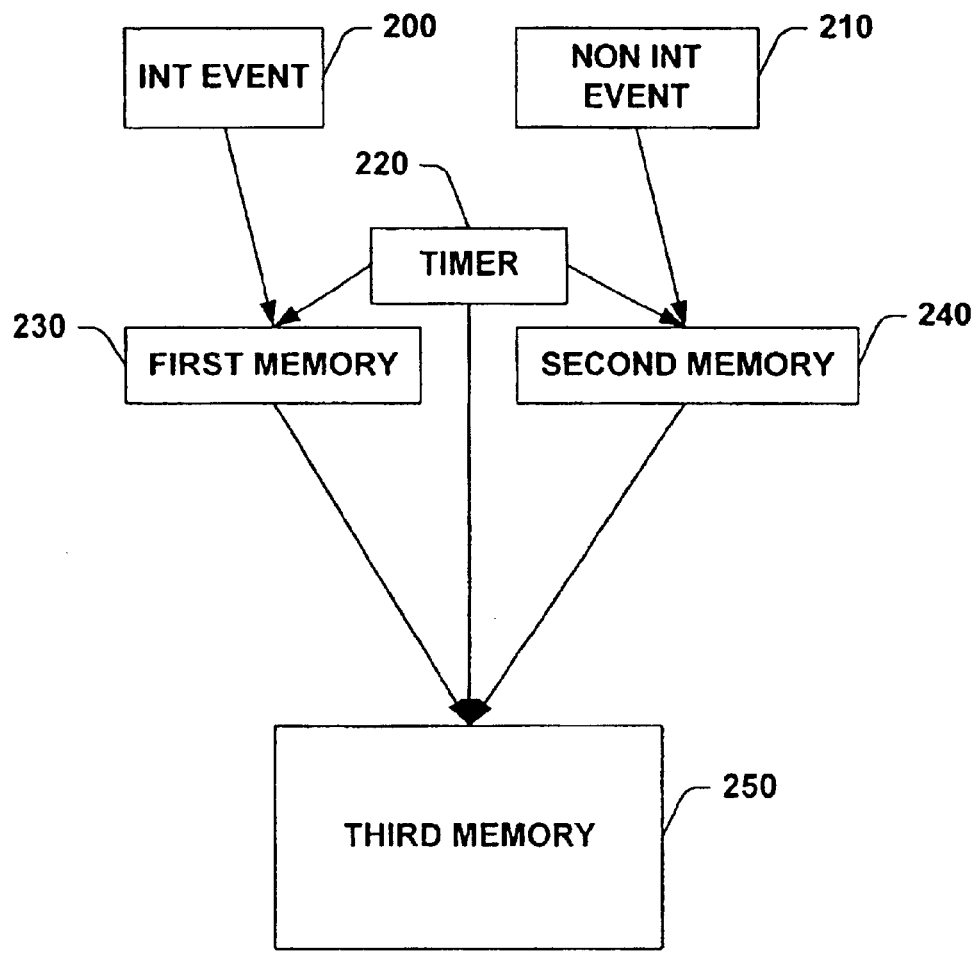
FIG. 4 is a schematic block diagram illustrating a system for triple buffering information concerning events handled by an operating system kernel, the system including a timer component for associating a time stamp with the information, in accordance with an aspect of the present invention.

Turning now to FIG. 4, a system associating a time stamp with events handled by an operating system kernel is illustrated. When an interrupt event 200 occurs, a timer 220 can be employed to selectively associate a time stamp with the interrupt event 200 as data concerning the interrupt event 200 is written to a first memory 230. Alternatively, the timer 220 can be employed to selectively associate a time stamp with the data concerning the interrupt event 200 as it is moved from the first memory 230 to a third memory 250. Similarly, when a non-interrupt event 210 occurs, the timer 220 can be employed to selectively associate a time stamp with the non-interrupt event 210 as data concerning the non-interrupt event 210 is written to a second memory 240. Alternatively, the timer 220 can be employed to selectively associate a time stamp with the data concerning the non-interrupt event 210 as it is moved from the second memory 240 to the third memory 250. Whether a time stamp is associated with data associated with an interrupt event 200 and/or a non-interrupt event 210 can be controlled by the present invention. By way of illustration, a user interface can present an administrator configuring event logging with an option for deciding whether to associate time stamps with events. By way of further illustration, one or more calls can be made to an Application Programming Interface (API) to turn on and turn off associating time stamps with event data. A time stamp can include, but is not limited to, a bit count, a time of day indicator, a real time count, an absolute time count, a relative time count, and/or an epoch counter. It is to be appreciated by one skilled in the art that any suitable time stamp may be employed in accordance with the present invention.

Figure 5:
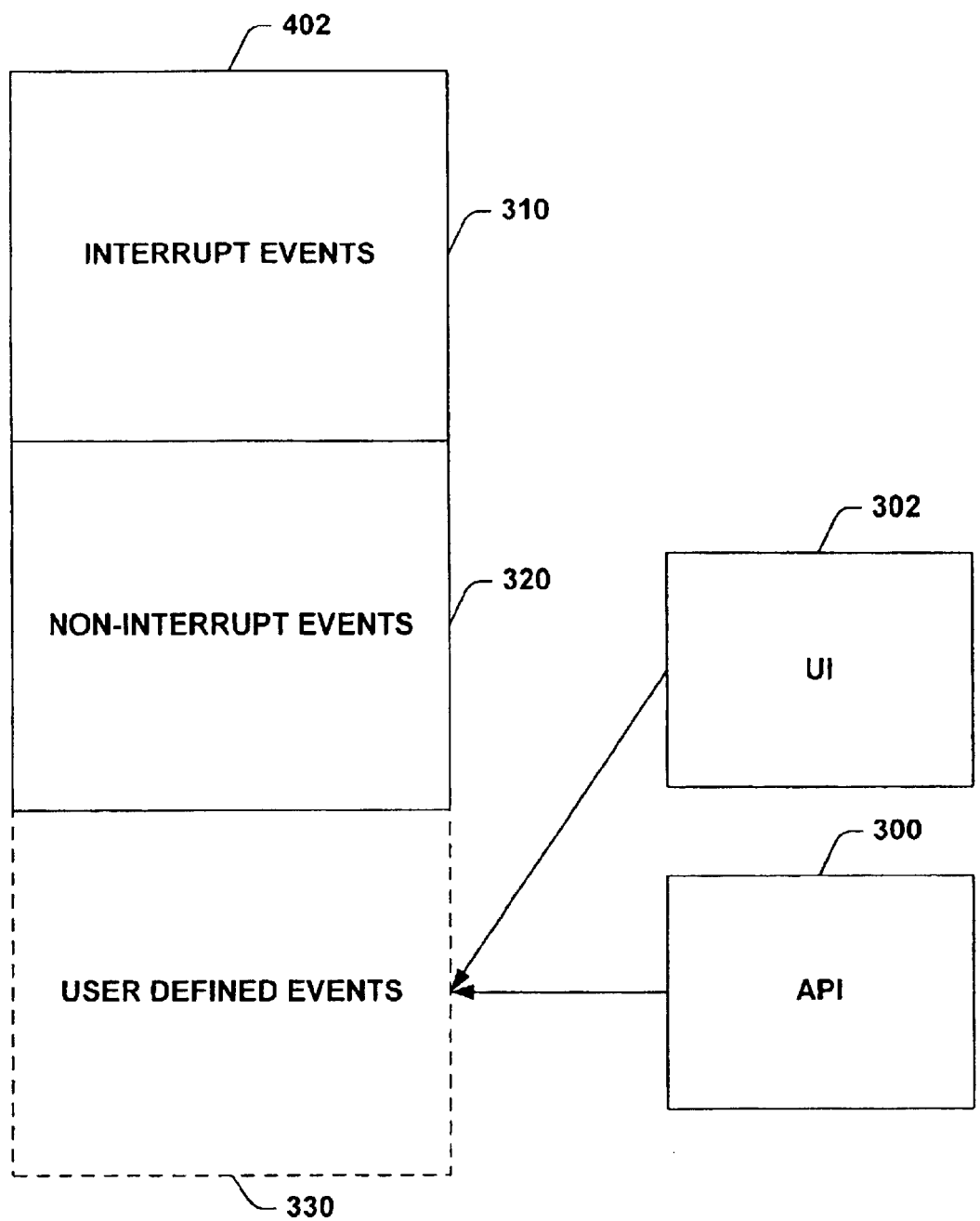
FIG. 5 illustrates an Application Programming Interface (API) and a User Interface (UI) employed to facilitate creating user defined events, in accordance with an aspect of the present invention.

Turning now to FIG. 5, an Application Programming Interface (API) 300 and a User Interface 302 (UI) employed to facilitate creating user-defined events 330 is illustrated. In an example aspect of the present invention, a list 402 of events to be logged can include both pre-defined interrupt events 310 and pre-defined non-interrupt events 320. But the present invention may not have anticipated all the events that an administrator may desire to log. Thus, the API 300 and the UI 302 are provided to facilitate creating user-defined events 330 that can be added to the list 402 of events to be logged. Monitoring an operating system may be undertaken for many reasons. For example, an operating system can be monitored to determine the effect of adding a new piece of hardware, the effect of adding a new software component, and/or to determine the amount of operating system resources being allocated to handle certain events. But it is difficult to anticipate all the reasons for which an operating system may be monitored. Thus the API 300 and/or the UI 302 provide means for defining new events, for example, an event occurring when an application accesses a database.

Figure 6:
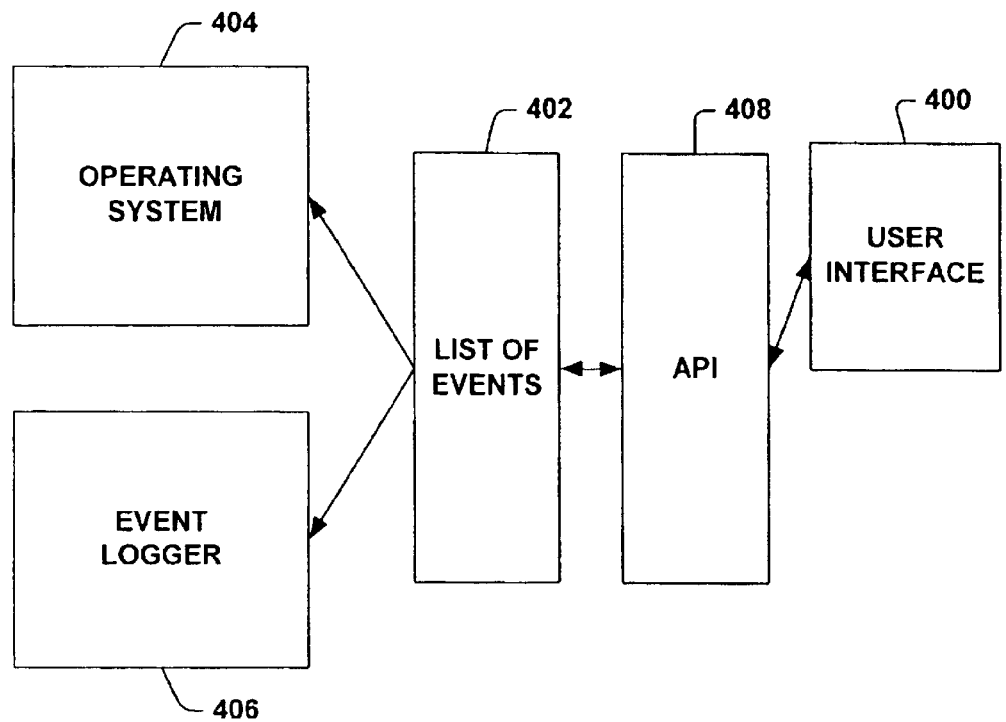
FIG. 6 illustrates a User Interface (UI) employed to facilitate selecting events to be logged from a list of events that can be logged, in accordance with an aspect of the present invention.

FIG. 6 illustrates a User Interface (UI) 400 employed to facilitate an administrator selecting events to be logged from a list 402 of events that can be logged. As mentioned above, an operating system 404 can be monitored for many reasons. For example, the operating system 404 can be monitored to determine the effect of adding a new piece of hardware, the effect of adding a new software component, and/or to determine the amount of operating system resources being allocated to handle certain events. Further, the operating system 404 can be monitored at different times for different reasons. For example, after adding a new hardware component to the computer on which the operating system 404 is running, hardware interrupts associated with the new hardware component can be monitored. Similarly, after exposing the operating system 404 to a new software component, non-interrupt events generated by the new software component can be monitored. Thus, the present invention provides the user interface 400 to facilitate choosing which events from a list 402 of events will be logged. In an exemplary aspect of the present invention, the user interface 400 can present the list 402 of events to an administrator who can select events handled by the operating system 404 that are to be logged by an event logger 406. By providing the user interface 400 to an administrator, the present invention facilitates selecting events to be logged from a list 402 of events. Thus, a smaller and/or more precise set of events to be monitored can be selected, which minimizes the intrusiveness of monitoring the operating system and thus mitigates problems associated with conventional event logging systems.

In an example aspect of the present invention, the user interface 400 is operably connected to an Application Programming Interface 408 (API). Interactions with the user interface 400 (e.g. picking an event to log) can generate one or more calls to the API 408. The API 408 can update the list of events 402 to be logged based on the one or more calls.

Figure 7:
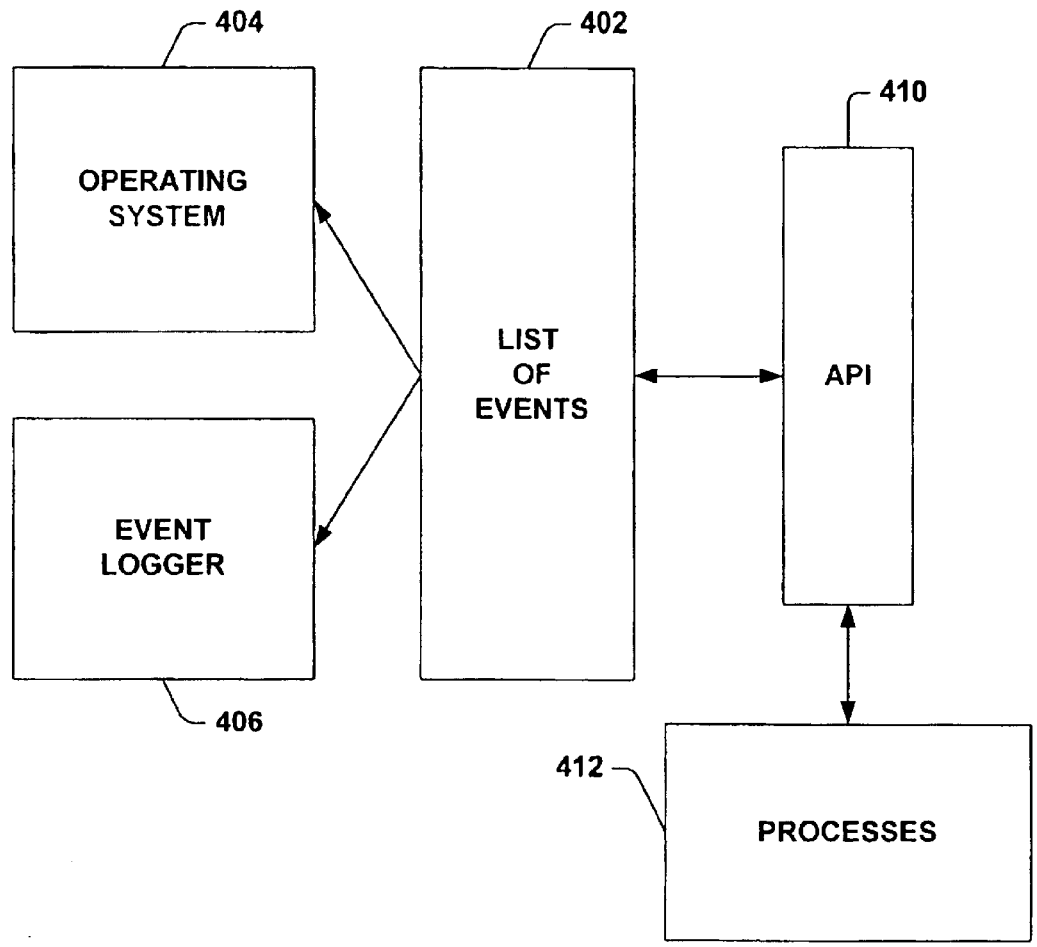
FIG. 7 illustrates an API employed to facilitate selecting events to be logged from a list of events that can be logged, in accordance with an aspect of the present invention.

FIG. 7 illustrates an Application Programming Interface (API) 410 employed to facilitate one or more processes 412 selecting events to be logged from a list 402 of events that can be logged. As mentioned above, the operating system 404 may be monitored for many reasons. For example, the operating system 404 can be monitored to determine the effect of adding a new piece of hardware, the effect of adding a new software component, and/or to determine the amount of operating system resources being allocated to handle certain events. Since conditions under which the operating system 404 can change, the API 410 facilitates the event logger 406 monitoring the operating system 404 at different times for different reasons. For example, at a first point in time, while the operating system 404 is supporting an application that is memory interrupt intensive, one or more calls to the API 410 from one or more processes 412 can turn on monitoring memory interrupts by the event logger 406. Similarly, at a second point in time, while the operating system 404 is supporting an application that frequently accesses data communications services, one or more calls to the API 410 by one or more processes 412 can turn off monitoring memory interrupts by the event logger 406 and can turn on monitoring non-interrupt events associated with supporting data communications services. Further, at a third point in time, while the operating system 404 is supporting a user-written application that generates user-defined events, one or more calls to the API 410 from one or more processes 412 can turn off monitoring the non-interrupt events associated with supporting the data communications services and can turn on monitoring the user-defined events by the event logger 406.

By providing the API 410 to processes 412, which API 410 facilitates selecting events to be logged from a list 402 of events, a smaller and/or more precise set of events to be monitored by the event logger 406 can be selected, thus facilitating minimizing the intrusiveness of monitoring the operating system and thereby mitigating problems associated with conventional event logging systems.

Figure 8:
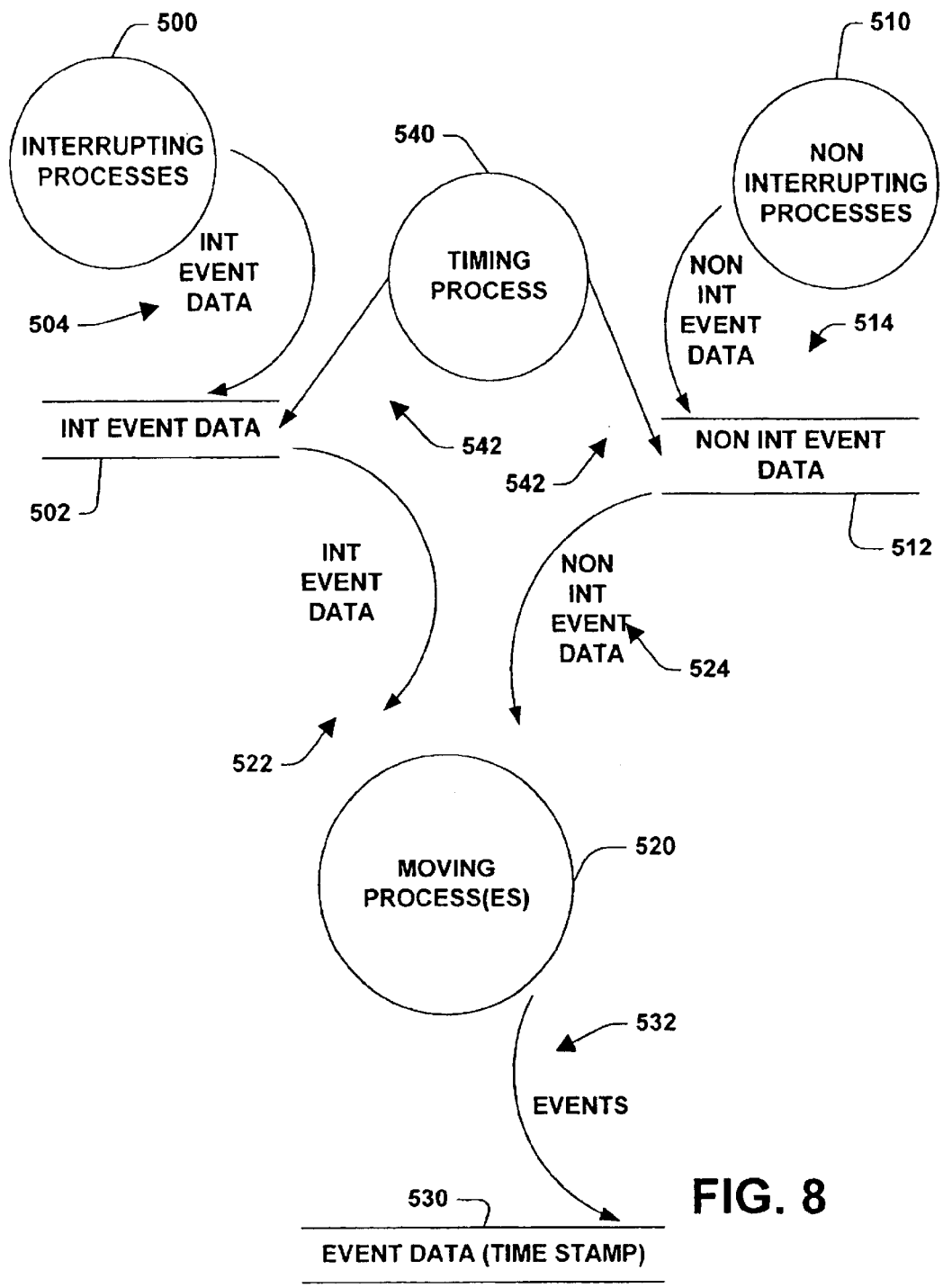
FIG. 8 is a data flow diagram illustrating a data flow through a system for triple buffering information concerning events handled by an operating system kernel, in accordance with an aspect of the present invention.

Turning now to FIG. 8, a data flow diagram illustrating a data flow through a system for triple buffering information concerning events handled by an operating system kernel is illustrated. One or more interrupting processes 500 can generate interrupt event data 504 that can be stored in an interrupt event data store 502. By way of illustration, the interrupt event data 504 can include information concerning the type of interrupt that was generated and the device causing the interrupt. One or more non-interrupting processes 510 can generate non-interrupt event data 514 that can be stored in a non-interrupt event data store 512. By way of illustration, the non-interrupt event data 514 can include information concerning the type of the non-interrupt event and the application causing the event. It is to be appreciated by one skilled in the art that although type and device/application information is discussed in connection with the interrupt event data 504 and the non-interrupt event data 514, that other information can be provided in accordance with the present invention.

Moving the non-interrupt event data 514 to the non-interrupt event data store 512 can be interrupted by the interrupting processes 500. Similarly, moving the non-interrupt event data 524 from the non-interrupt event data store 512 to an event data store 530 can be interrupted by the interrupting processes 500. Since the data flow from the non-interrupting processes 510 can be interrupted, the present invention includes a method to determine whether the data flow from the non-interrupting processes 510 was interrupted, and if so, to retry writing the non-interrupt event data 514 and/or the non-interrupt event data 524.

One or more moving processes 520 can receive interrupt event data 522 from the interrupt event data store 502. The one or more moving processes 520 can move the interrupt event data 522 to the event data store 530. Similarly, the one or more moving processes 520 can receive non-interrupt event data 524 from the non-interrupt event data store 512. The one or more moving processes 520 can move the non-interrupt event data 524 to the event data store 530. In an example aspect of the present invention, the interrupt event data 522 and the non-interrupt event data 524, as they are moved by the moving processes 520 can be treated similarly as event data 532.

FIG. 8 illustrates the bifurcation of data flow for interrupting processes 500 and non-interrupting processes 510. By separating the initial processing carried out by the present invention into processing that handles interrupting processes 500 by writing to an interrupt event data store 502 and processing that handles non-interrupting processes 510 by writing to a non-interrupt event data store 512, problems associated with interrupt event data 504 interfering with non-interrupt event data 514 are mitigated. Such interference is likely in conventional systems since interrupting processes can interrupt non-interrupting processes, which can disrupt writing event logging data to a single buffer. Another interference problem that is mitigated by the present invention is the interference problem that occurs when a non-interrupt event is swapped out (e.g. time slice expires, higher priority non-interrupt event takes control) before it has completed writing its non-interrupt event data, and the non-interrupt event swapped in overwrites the data associated by the swapped out non-interrupt event. The present invention thus provides a method for a non-interrupt event that has been swapped out and swapped back in to determine whether writing non-interrupt event data completed successfully. If the writing did not complete successfully, the present invention provides a method for rewriting the non-interrupt event data that was not written successfully.

By separating the moving processes 520 from the initial writing of interrupt event data 504 to the interrupt event data store 502 and from the initial writing of the non-interrupt event data 514 to the non-interrupt event data store 512, so that moving data from the interrupt event data store 502 and moving data from the non-interrupt data store 512 is handled during non-event-handling processing time mitigates intrusiveness problems in conventional event logging systems by reducing the amount of processing undertaken during event-handling time.

FIG. 8 further illustrates a timing process 540 that can produce time stamp data 542 that can be associated with interrupt event data 504 in the interrupt event data store 502 and with non-interrupt event data 514 in the non-interrupt event data store 512. The time stamp data 542 can facilitate arranging both interrupt event data 522 and non-interrupt event data 524 in chronological order by subsequent processes (e.g., graphical event viewer). Displaying interrupt data 522 and non-interrupt data 524 in chronological order improves accuracy in event logging and can facilitate understanding the timing relationships between the event data 532, which can be important in diagnosing timing, contention, and deadlock problems, for example.

In view of the exemplary systems shown and described above, methodologies, which may be implemented in accordance with the present invention, will be better appreciated with reference to the flow diagrams of FIG. 9A, 9B, FIG. 10 and FIG. 11. While, for purposes of simplicity of explanation, the methodologies of FIG. 9A, FIG. 9B, FIG. 10 and FIG. 11 are shown and described as a series of steps, it is to be understood and appreciated that the present invention is not limited by the order of the steps, as some steps may, in accordance with the present invention, occur in different orders and/or concurrently with other steps from that shown and described herein. Moreover, not all illustrated steps may be required to implement a methodology in accordance with the present invention.

Figure 9A:
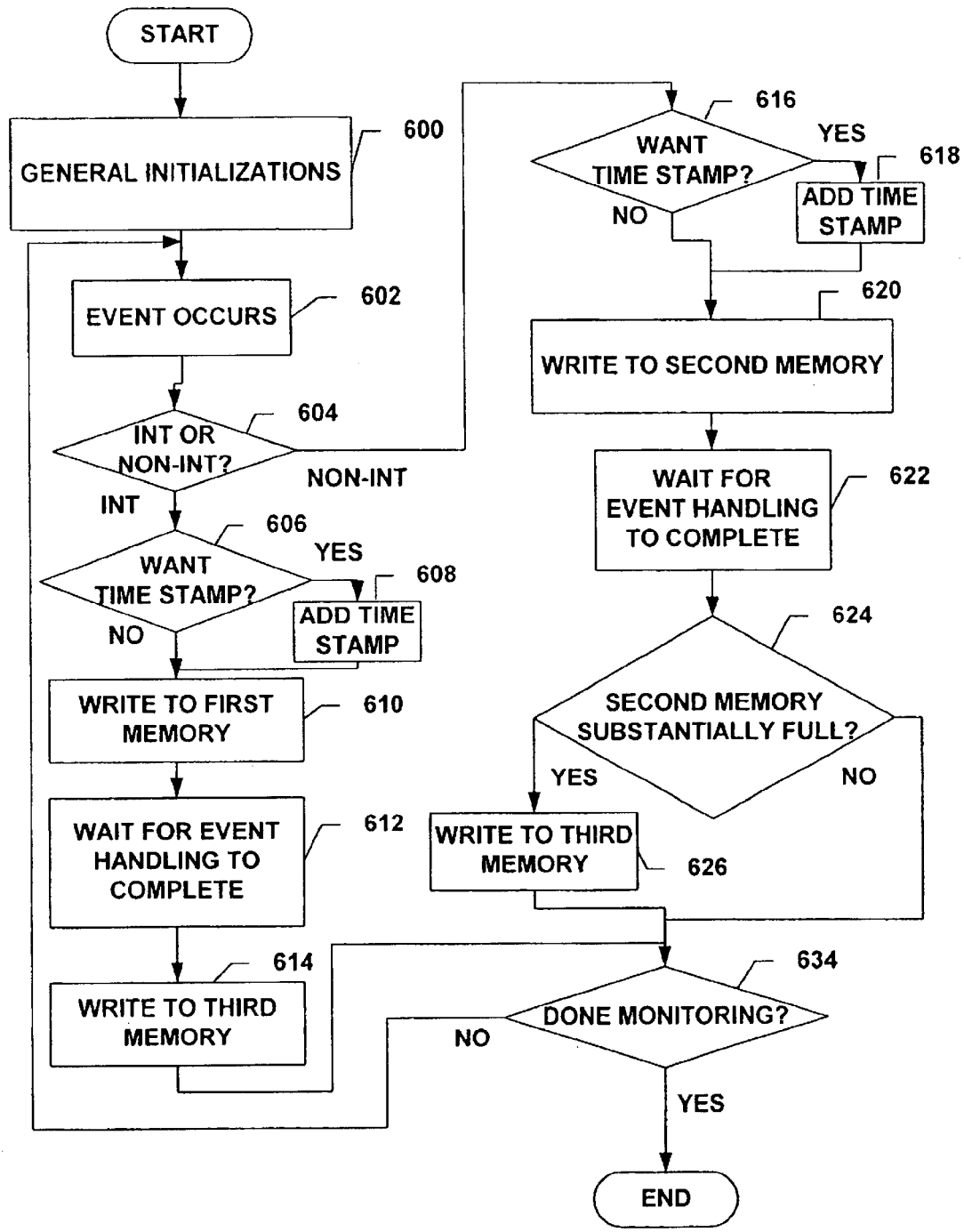
FIG. 9A is a flow chart illustrating a method for triple buffering information concerning events handled by an operating system kernel, in accordance with an aspect of the present invention.

Turning now to FIG. 9A, a method for triple buffering information concerning events handled by an operating system and/or operating system kernel is flow-charted. At step 600 general initializations are performed. For example, initializations including, but not limited to, clearing memories associated with storing interrupt and non-interrupt event data, resetting counters and timers, and preparing data communications devices can be undertaken. At step 602, the method waits for an event to occur.

At step 604, a determination is made concerning whether the event received by the process after waiting at step 602 is an interrupt event or a non-interrupt event. If the determination at step 604 is that the event of step 602 is an interrupt event, then at step 606 a determination is made concerning whether a time stamp is desired for the data that will be written to a first memory. If the determination at step 606 is YES, then at step 608 a time stamp is added to the data that will be written to the first memory in step 610. At step 610, information concerning the interrupt event can be written to a first memory. At step 612, the method waits for the event handler that is handling the event of step 602 to complete, after which, at step 614, the information written in step 610 can be written to a third memory and/or made available for transporting to other processes and/or devices. If the determination at step 604 was that the event of step 602 was a non-interrupt event, then at step 616 a determination is made concerning whether a time stamp is desired for the data that will be written to a second memory. If the determination at step 616 is YES, then at step 618 a time stamp is added to the data that will be written to the second memory in step 620. At step 620 information concerning the non-interrupt event can be written to a second memory. At step 622, the method waits for the event handler that is handling the event of step 602 to complete. At step 624 a determination is made concerning whether the second memory is substantially full. If the determination at step 624 is YES, then at step 626 the second memory can be written to the third memory. It is to be appreciated by one skilled in the art that although one method for determining when to write the first memory to the third memory is illustrated, the method waiting for the event handling to complete, that other methods of determining when to write the first memory to the third memory can be employed in accordance with the present invention. It is to be similarly appreciated that although one method for determining when to write the second memory to the third memory is illustrated that other methods of determining when to write the second memory to the third memory can be employed in accordance with the present invention.

At step 634 a determination is made concerning whether the monitoring method has completed. If the determination at step 634 is YES, then the monitoring method concludes, otherwise the method continues processing by returning to step 602 to await the next event. By removing processing from event-handling time, the method is less intrusive than methods that perform more processing associated with the logging during event handling time.

Figure 9B:
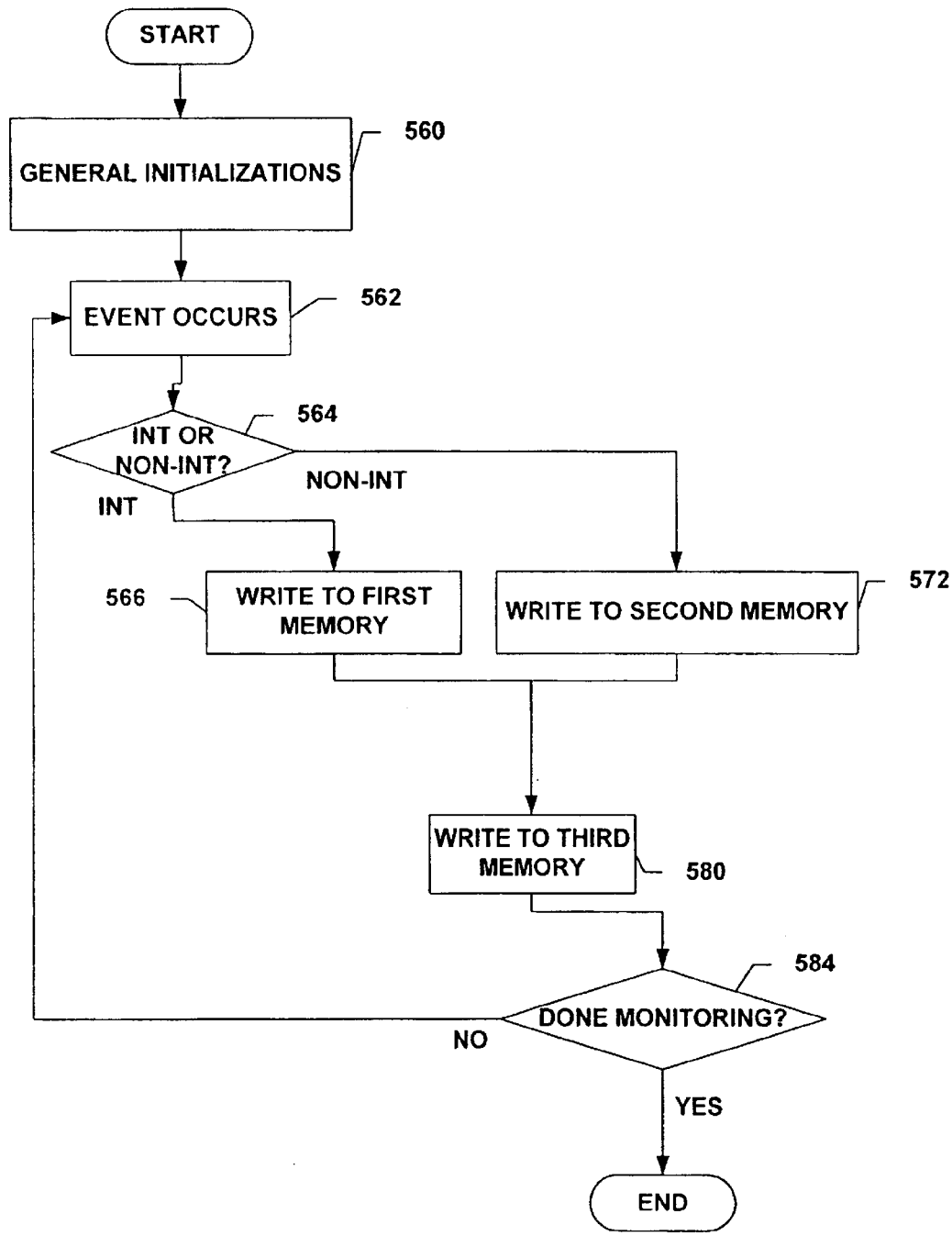
FIG. 9B is a flow chart illustrating a method for triple buffering information concerning events handled by an operating system kernel, the method implemented in part by a hardware probe, in accordance with an aspect of the present invention.

Turning now to FIG. 9B, a method for triple buffering information concerning events handled by an operating system and/or operating system kernel is flow-charted. The method described in FIG. 9B can be associated with a hardware probe, for example. At step 560 general initializations are performed. For example, initializations including, but not limited to, clearing memories associated with storing interrupt and non-interrupt event data, resetting counters and timers, and preparing data communications devices can be undertaken. At step 562, the method waits for an event to occur.

At step 564, a determination is made concerning whether the event received by the process after waiting at step 562 is an interrupt event or a non-interrupt event. If the determination at step 564 is that the event of step 562 is an interrupt event, then at step 566, information concerning the interrupt event can be written to a first memory. The first memory can be, for example, a hardware port. At step 580, the information written in step 566 can be written to a third memory under hardware control. If the determination at step 564 was that the event of step 562 was a non-interrupt event, then at step 572 information concerning the non-interrupt event can be written to a second memory. At step 580, the information written in step 572 can be written to a third memory under hardware control. At step 580, a time stamp can be added to the information being written to the third memory, such time stamp being produced under hardware control.

At step 584 a determination is made concerning whether the monitoring method has completed. If the determination at step 584 is YES, then the monitoring method concludes, otherwise the method continues processing by returning to step 562 to await the next event. By removing processing from the machine running the operating system being monitored, the method is less intrusive than methods that perform more processing on the machine running the operating system being monitored.

Figure 10:
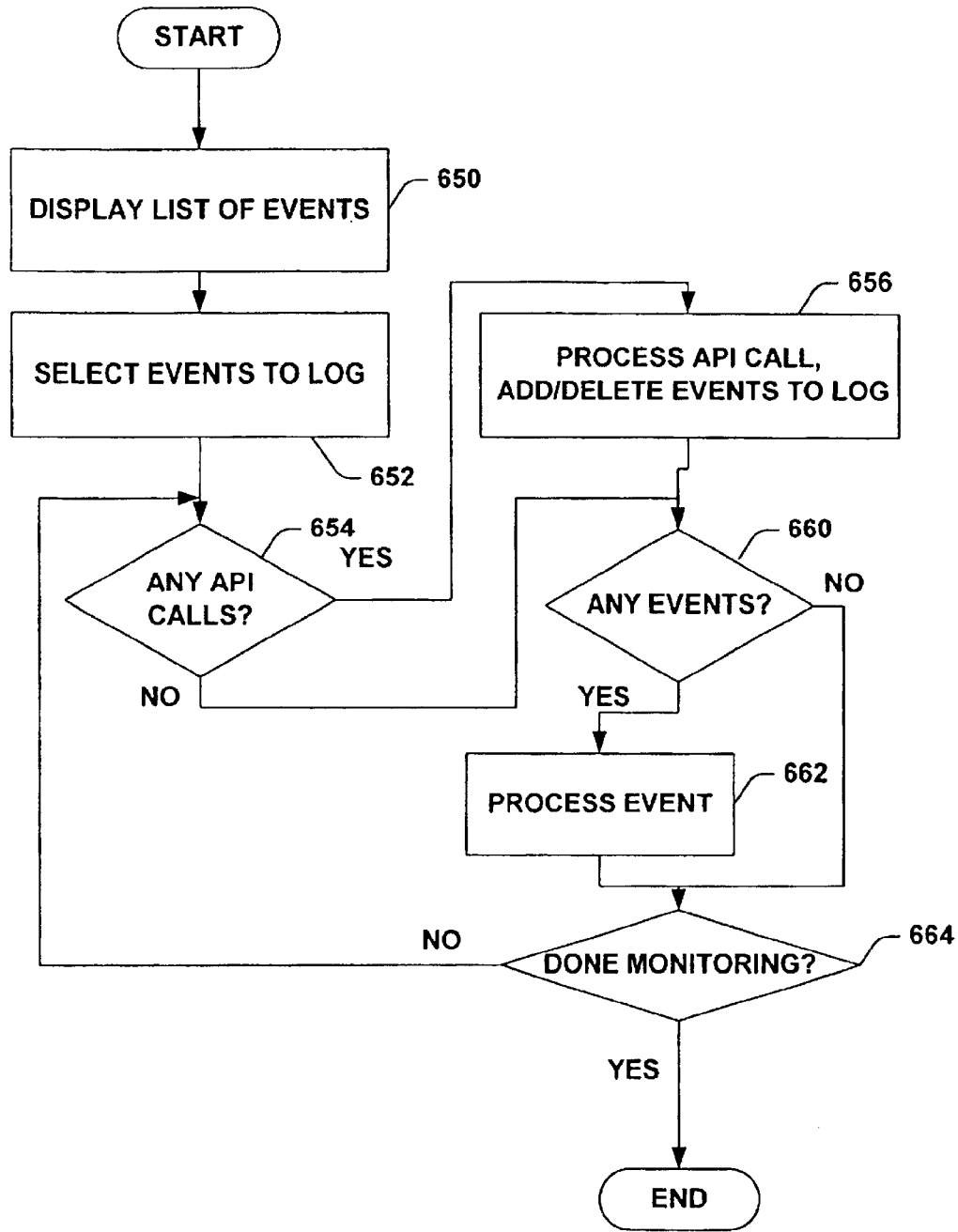
FIG. 10 is a flow chart illustrating a method for selecting events to be logged by a system for triple buffering information concerning events handled by an operating system kernel, in accordance with an aspect of the present invention.

Turning now to FIG. 10, a method for selecting events to be logged by a system for triple buffering information concerning events handled by an operating system kernel is flow-charted. At step 650 a list of the events that can be logged can be displayed, for example, via a User Interface (UI). At step 652, the events to be logged can be selected. For example, the list of events may include R interrupt events, R being an integer, S non-interrupt events, S being an integer, and T user-defined events, T being an integer. From the set of R+S+T events that potentially could be logged, a subset R'+S'+T' can be selected. Thus, a more focused set of events can be logged, which facilitates making the present invention less intrusive, and thus mitigates problems with conventional logging methods. In an example aspect of the present invention, the UI is displayed before monitoring begins to facilitate an initial selection of events to be logged. It is to be appreciated by one skilled in the art that events could also be selected from the UI while the event logger is running.

At step 654 a determination can be made concerning whether any Application Programming Interface (API) calls have been received, where such API calls can dynamically change the list of events to be logged. For example, from the R+S+T set of step 652, a set R"+S"+T" can be selected. Thus, the events to be logged can be updated dynamically during the processing of the method. If the determination at step 654 is YES, then at step 656 the list of events to be logged is changed. For example, interrupts events may be added to the list of events to log, while non-interrupt events and user-defined events may be deleted from the list of events to log. It is to be appreciated by one skilled in the art that API calls may arrive during the monitoring process, and that steps 654 and 656 are intended to facilitate changing the list of events to be logged while the monitor is running. At step 660 a determination is made concerning whether any events have occurred that need to be logged. If the determination at step 660 is YES, then at step 662, the event can be processed. At step 664 a determination is made concerning whether monitoring is to conclude. If the determination at step 664 is YES, then monitoring concludes, otherwise the method returns to step 654.

Figure 11:
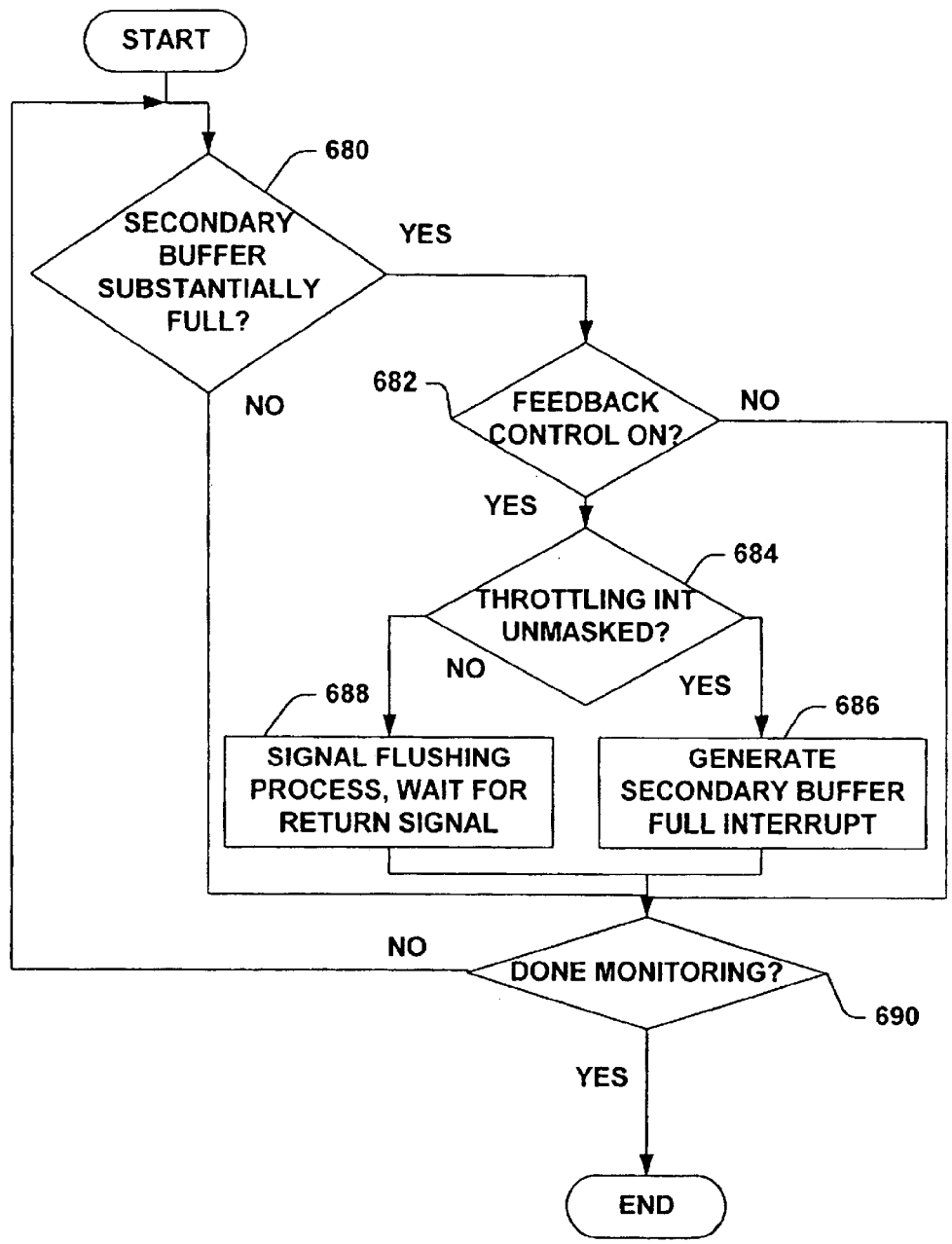
FIG. 11 is a flow chart illustrating a method for throttling input to a system for triple buffering information concerning events handled by an operating system kernel, in accordance with an aspect of the present invention.

Turning now to FIG. 11, a method for restricting (e.g. throttling) input to an event logger is flow-charted. At step 680 a determination is made concerning whether a secondary buffer, containing information associated with interrupt and/or non-interrupt data is substantially full (e.g. 80%). The secondary buffer may, for example, be located on an external hardware probe. If the determination at step 680 is YES, then at step 682 a determination is made concerning whether feedback control has been initiated. If the determination at step 682 is YES, then at step 684 a determination is made concerning the type of feedback control that has been initiated. If the determination at step 684 is that a throttling interrupt is unmasked, then at step 686 a "secondary buffer full" interrupt can be generated. Such an interrupt may beprocessed by an external hardware probe, for example. The interrupt may also be handled by an operating system interrupt service routine operable to produce busy looping until an indication that processing may resume is received. If the determination at step 684 is that a throttling interrupt is masked, then at step 688 a signal can be sent to a flushing process that can, for example, flush the secondary buffer. After sending the signal at step 688, the method can wait for a return signal from the flushing process, indicative of the flushing process having freed a portion of the secondary buffer, thus facilitating receiving and processing more events. Although two feedback control techniques have been discussed in association with step 684, it is to be appreciated by one skilled in the art that a greater or lesser number of techniques may be employed in accordance with the present invention and that other suitable feedback control techniques may be employed. Furthermore, although a determination is indicated at step 684, masking and/or unmasking the "secondary buffer full" interrupt can operate to remove the determination at step 684.

At step 690 a determination is made concerning whether throttling monitoring is complete. If the determination is YES, then throttling monitoring concludes, otherwise processing returns to step 680.

Figure 12:
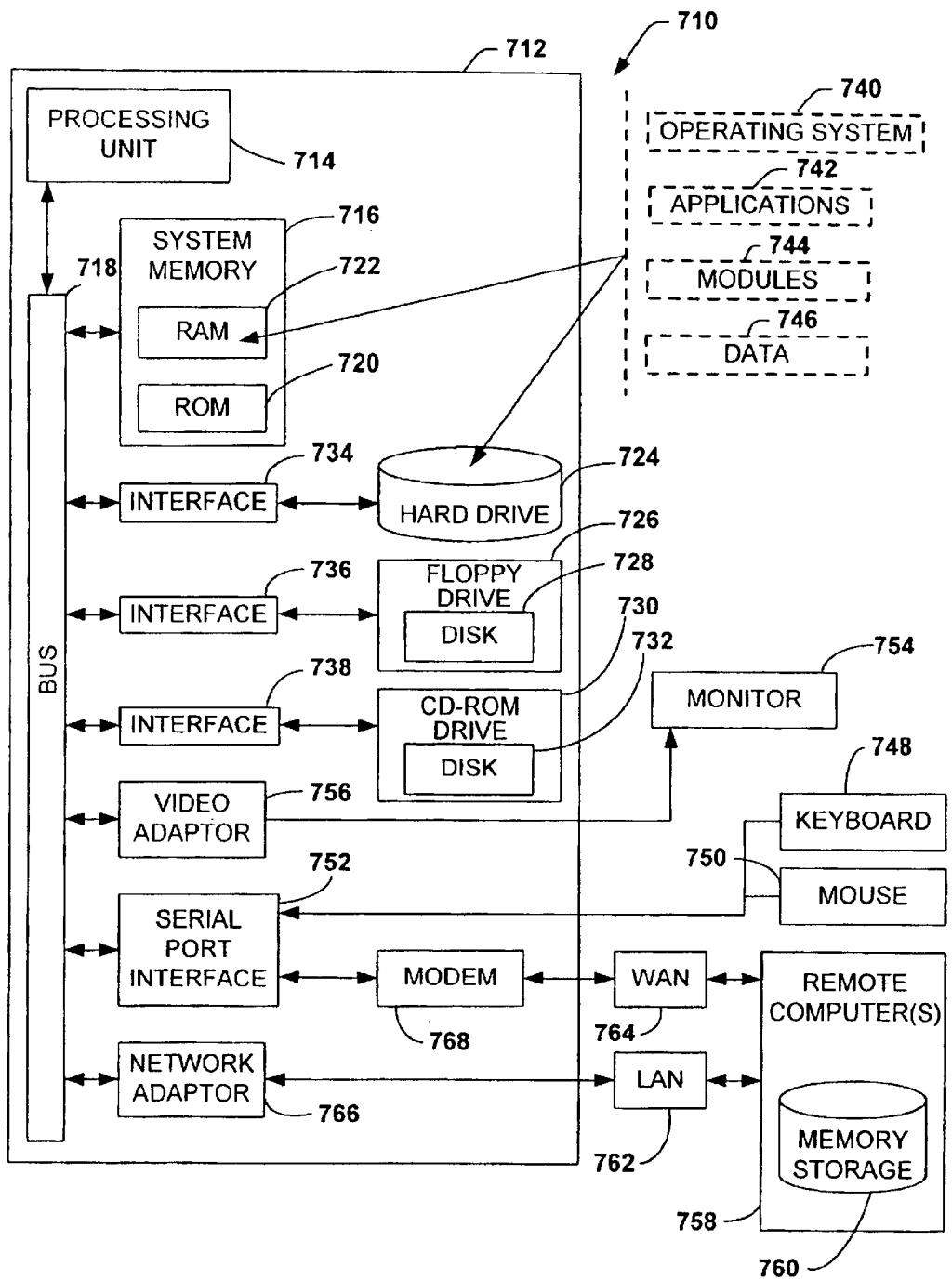
FIG. 12 is a schematic block diagram of an exemplary operating environment for a system configured in accordance with the present invention.

In order to provide additional context for various aspects of the present invention, FIG. 12 and the following discussion are intended to provide a brief, general description of a suitable computing environment 710 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 12, an exemplary environment 710 for implementing various aspects of the invention includes a computer 712, including a processing unit 714, a system memory 716, and a system bus 718 that couples various system components including the system memory to the processing unit 714. The processing unit 714 may be any of various commercially available processors. Dual microprocessors and other multi-processor architectures also can be used as the processing unit 714.

The system bus 718 may be any of several types of bus structure including a memory bus or memory controller, a peripheral bus, and a local bus using any of a variety of conventional bus architectures such as PCI, VESA, Microchannel, ISA, and EISA, to name a few. The computer 712 memory includes read only memory (ROM) 720 and random access memory (RAM) 722. A basic input/output system (BIOS), containing the basic routines that help to transfer information between elements within the computer 712, such as during start-up, is stored in ROM 720. The computer 712 further includes a hard disk drive 724, a magnetic disk drive 726, e.g., to read from or write to a removable disk 728, and an optical disk drive 730, e.g., for reading a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744, and program non-interrupt data 746. The operating system 740 in the illustrated computer is, for example, the "Microsoft® Windows® NT®" operating system, although it is to be appreciated that the present invention may be implemented with other operating systems or combinations of operating systems, such as UNIX®, LINUX®, etc.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance (e.g., a WebTV® client system), a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752. In a networked environment, program modules depicted relative to the computer 712, or portions thereof, may be stored in the remote memory storage device 760. It will be appreciated that the network connections shown are exemplary and other means of establishing a communications link between the computers may be used.

Figure 13:
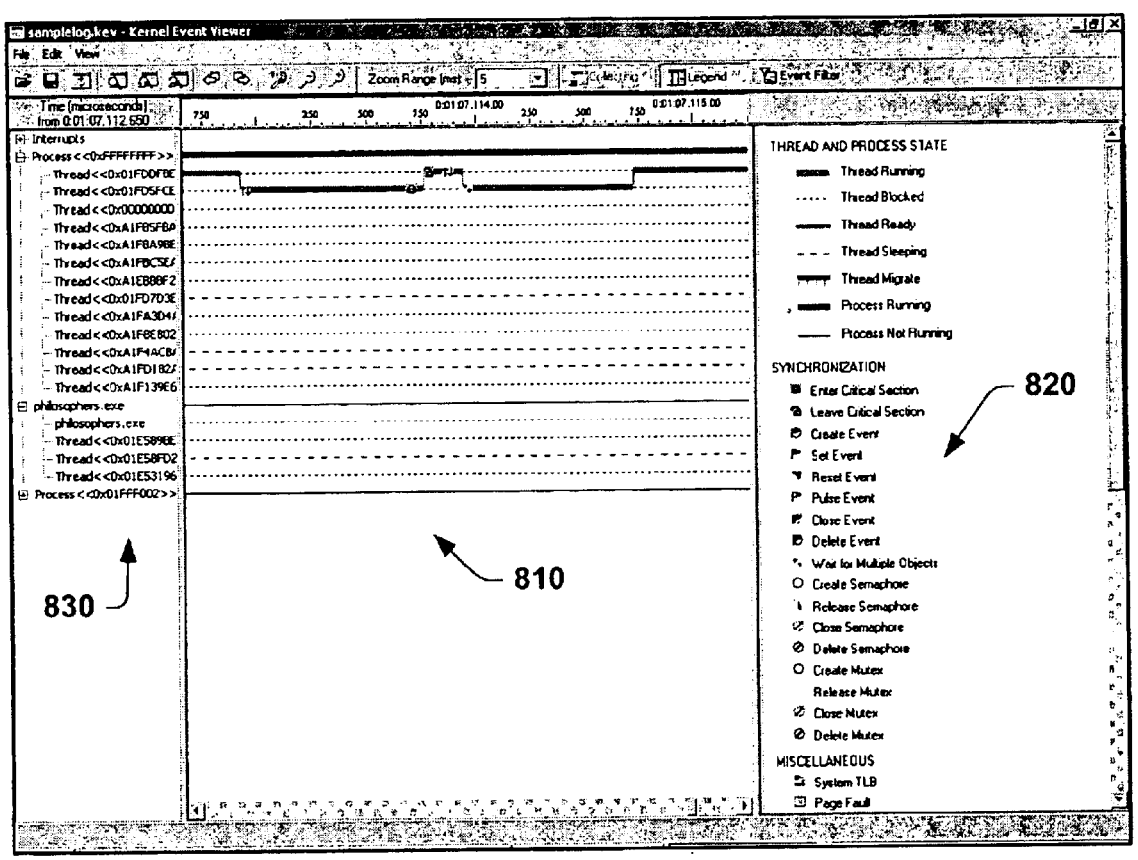
FIG. 13 is a screen shot of the output from a process for viewing information gathered by the operating system monitor, in accordance with an aspect of the present invention.

Turning now to FIG. 13, a screen shot 800 of the output from a process for viewing information gathered by the system 10 (FIG. 1) is provided. The screen shot 800 illustrates a log area 810, a legend area 820, and a process pane 830. The log area 810 facilitates understanding the running of the operating system being monitored. For example, a horizontal line can be associated with a process, and attributes including, but not limited to the size, shape, color, location, and presence of icons can be associated with the horizontal line. Such visual indicators facilitate understanding the data gathered by the operating system and thus facilitate understanding the running of the operating system being monitored. By way of illustration, the visual indicators can facilitate visualization of time-based thread interactions, and system events that occur in the running system. It is to be appreciated by one skilled in the art that different visual indicators can be associated with the horizontal line to convey information about a process in accordance with the present invention.

One or more threads can be associated with a process. The interactions between threads may be important to diagnosing operating system, device driver and/or application program problems. Thus, the present invention facilitates displaying the one or more threads associated with a process. The process pane 830 facilitates selecting which threads and/or processes to display in the log area 810. For example, a process may be associated with five threads. By expanding the process in the process pane 830, the example five threads can be viewed in the log area 810. In an exemplary aspect of the present invention, the log area 810 facilitates viewing items including, but not limited to, process states, thread states, process events, thread events, process switching, thread switching, events, changing states of semaphores, changing states of mutexs, entering/leaving a critical section, and the occurrence of user defined events.

Tracking processes and/or threads can be important to diagnosing problems associated with programs including, but not limited to, operating systems, device drivers, and/or applications. Thus, the present invention facilitates viewing information concerning processes and/or threads. Information collected concerning a process can be used to graphically display the process as being in one of at least three states, for example, running, not running and not alive. The running state indicates that at least one thread within the process is in the running state. The not running state indicates that no threads within the process are actively running. A process in the not running state can be in one of two sub-states, the ready to run sub-state and the not ready to run sub-state. In the ready to run sub-state, at least one thread is ready to run, but no threads are running. In the not ready to run sub-state no threads are ready to run (e.g. blocked, sleeping). The not alive state indicates that the process has not been created, or is no longer alive.

Information collected concerning a thread can be used to graphically display the thread as being in one of at least five states, for example, running, ready, blocked, sleeping, and not alive. In the running state, the thread is active and has possession of the CPU. In the ready state the thread is ready to run, but is not currently running. In the blocked state the thread is unable to run until an event such as a mutex becomes available. In the sleeping state the thread has voluntarily gone to sleep for a set duration while in the not alive state the thread has exited.

Since the system 10 may be run at different times for different reasons, an exemplary aspect of the present invention facilitates viewing the data gathered by the system 10 in one of at least three different modes: a real time mode; a system log of a previous run mode, and a limited buffer mode. The different modes facilitate monitoring an operating system for different reasons at different times. The real time mode displays data gathered by the system 10 (FIG. 1) in the log area 810 in near real time. Thus, the real time mode facilitates analyzing operating system problems substantially as they occur. The system log mode displays data gathered by the system 10 (FIG. 1) in the log area 810 from a file in which such data was stored. Thus, the system log mode facilitates monitoring an operating system at a first time, and then viewing the data gathered by such monitoring at a second, later time. The limited buffer mode also displays data gathered by the system 10 (FIG. 1) in the log area 810 from a file in which such data was stored. But the limited buffer mode is employed to gather data for a specified time period from a longer monitoring session. For example, an administrator may desire to perform a series of stress tests against an operating system. The stress test may run for twenty-four hours, for example. But the administrator may only be interested in the first ten minutes of data and the last 20 minutes of data. Thus, the limited buffer mode is provided to facilitate selecting such discrete intervals of time for which monitoring data should be gathered and/or displayed. By way of further illustration, an administrator may desire to view data upon the occurrence of triggering events, and/or at scheduled intervals. For example, the administrator may desire to view data when a semaphore is changed, and/or every ten minutes, for five seconds. The limited buffer mode facilitates selecting such types of data to view for such periods of time.

Viewing data gathered by the system 10 (FIG. 1) facilitates diagnosing problems including, but not limited to, deadlocks, and missed real time deadlines. By way of illustration, a deadlock problem can exist if a first thread is waiting for a resource held by a second thread, and the second thread is waiting for a resource held by a first thread. Examining data displayed in the log area 810 facilitates locating a resource that is blocking a thread, or a low priority thread holding a resource that is blocking a higher priority thread. Once the resource is located, then data associated with the resource can be searched to locate the thread holding the resource. Thus, threads creating deadlock conditions can be located which facilitates diagnosing deadlock problems.

By way of further illustration, real time deadlines can be missed when two periodic threads are running. A periodic thread is a thread that runs at a specified repeating time interval and that should complete within its time period. A first periodic process may run frequently (e.g. once per second) but require little time (e.g. one millisecond) to complete. A second periodic process may run infrequently (e.g. once per hour) but may require a long time (e.g. ten seconds) to complete. If both threads have the same priority, then it is possible that the first periodic thread will not be able to run according to its periodic schedule while the second periodic thread is running. Viewing data associated with the two periodic threads in the log area 810 can facilitate diagnosing problems with such competing periodic threads.

By way of further illustration of missed real time deadlines, a process may be required to display thirty frames of data per second to facilitate viewing a video image without gaps in the video display. But such a video display process may miss a real time deadline if threads of equal or higher priority are running. Determining which threads and/or processes are responsible for missed real time deadlines can facilitate diagnosing and resolving thread interaction problems.

In an exemplary aspect of the present invention, data collected for threads monitored by the system 10 will be represented in one or more horizontal lines. Icons may be placed on the horizontal lines to represent data associated with events that happened at that point in time. Information associated with the event represented by the icon can, for example, pop-up when a pointer passes over the icon. For example, information including, but not limited to: what event occurred; when an event occurred; which processes were affected; which threads were affected, and which objects were affected can be displayed.

Figure 14:
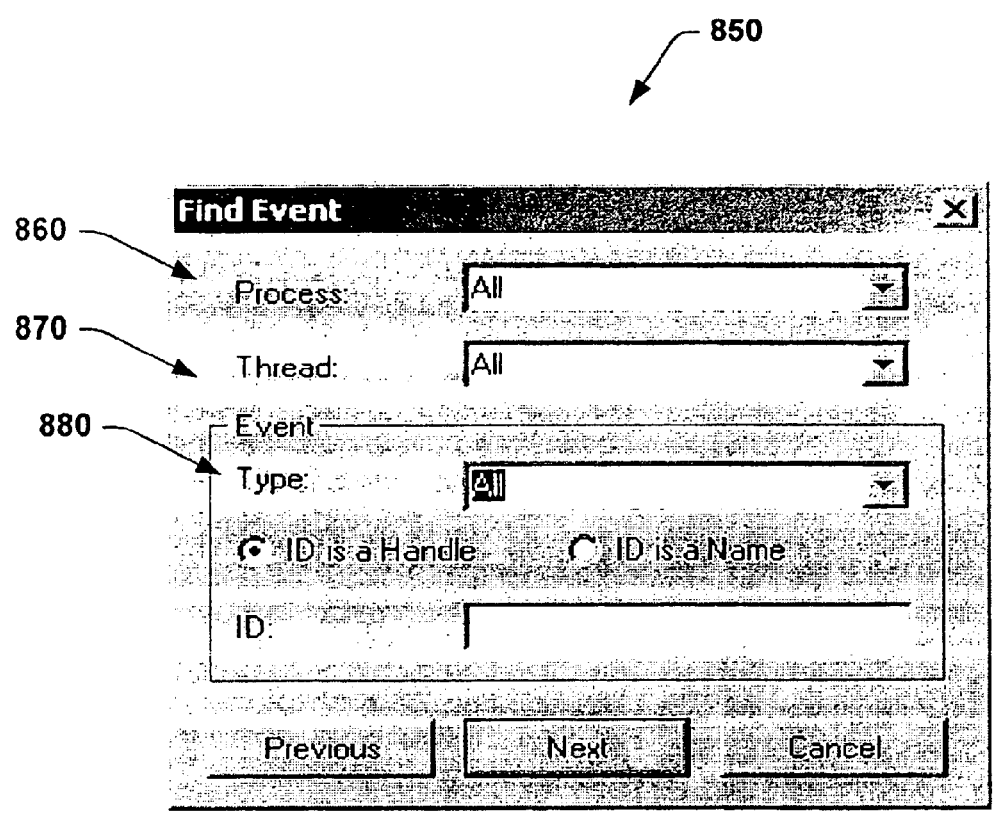
FIG. 14 is a screen shot of a User Interface that facilitates searching for events in data gathered by the operating system monitor, in accordance with an aspect of the present invention.

Turning now to FIG. 14, a screen shot 850 of a user interface that facilitates searching for events in data gathered by the system 10 (FIG. 1) is provided. Monitoring an operating system can produce data associated with processes and/or threads and events associated with the processes and/or threads. But an administrator may only be interested in a particular process and/or thread and/or event. Thus, the user interface displayed in the screen shot 850 provides a method for selecting a particular process via a process field 860. Similarly, the user interface displayed in the screen shot 850 provides a method for selecting a particular thread via a thread field 870. Similarly, the user interface displayed in the screen shot 850 provides a method for selecting a particular event via an event field 880. Restricting the data to be displayed to data associated with a particular process and/or thread and/or event can reduce the amount of processing time required to view the data, thus making the present invention less intrusive than conventional monitoring systems.

Figure 15:
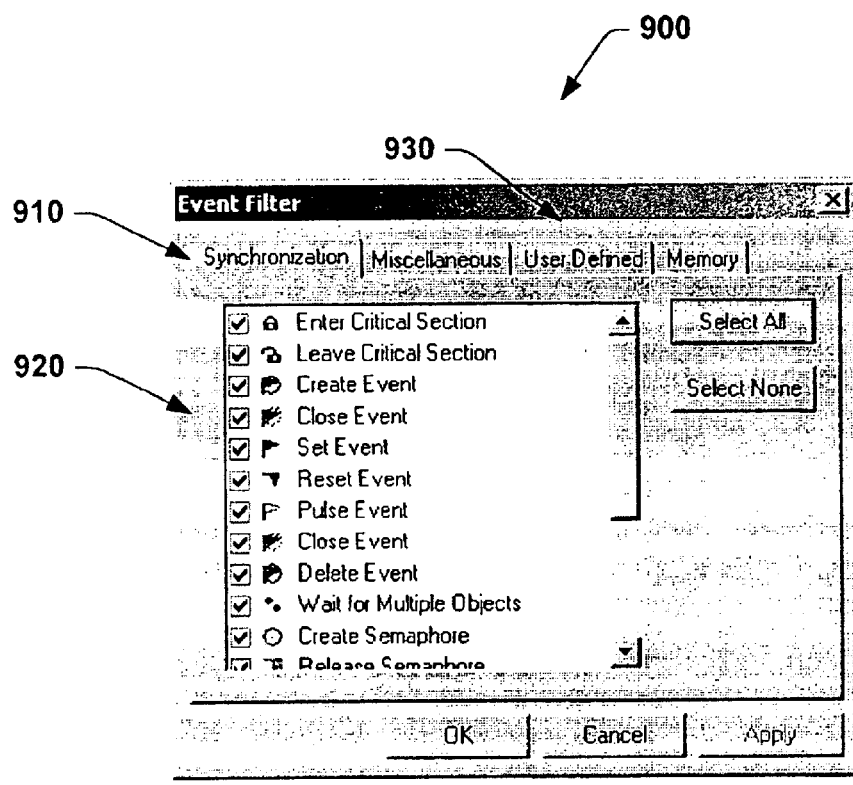
FIG. 15 is a screen shot of a User Interface that facilitates selecting a subset of data to view from data gathered by the operating system monitor, in accordance with an aspect of the present invention.

Turning now to FIG. 15, a screen shot 900 of a user interface that facilitates selecting a subset of data to view from data gathered by the system 10 (FIG. 1) is provided. Since an operating system can be monitored for different reasons, in an exemplary aspect of the present invention, the component and method for runtime display of monitoring data includes the user interface depicted in the screen shot 900 to facilitate selecting data to be viewed. The user interface includes a synchronization tab 910 that can facilitate choosing to display data associated with events associated with synchronization. For example, events listed in an event chooser 920 can include, but are not limited to: entering/leaving a critical section; creating/releasing a semaphore; pulse events, and wait for multiple object events. Processes, for example applications, may generate events that are not pre-defined in the system 10 (FIG. 1). Thus, the user interface can also include a user defined event tab 930 that can facilitate choosing to display data associated with user-defined events. Restricting the data to be displayed to data associated with particular events can reduce the amount of processing time required to view the data, thus making the present invention less intrusive than conventional monitoring systems.

Figure 16:
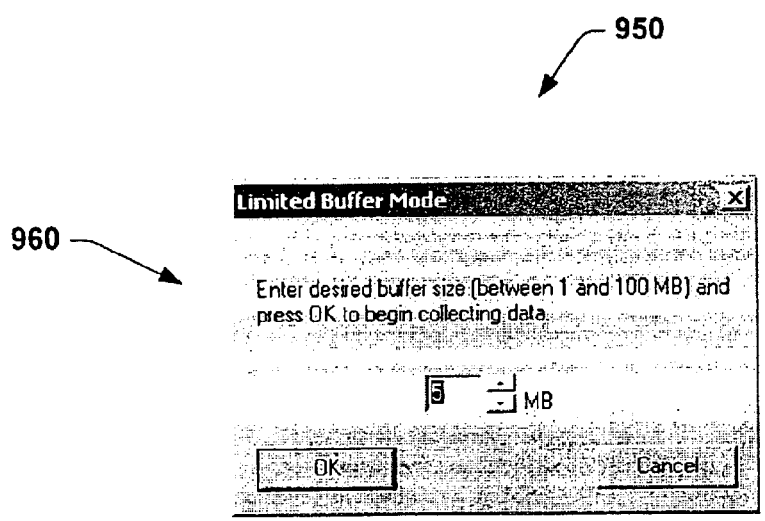
FIG. 16 is a screen shot of a User Interface for selecting a limited size for a buffer in which data gathered by the operating system monitor can be stored, in accordance with an aspect of the present invention.

Turning now to FIG. 16, a screen shot 950 of a user interface for selecting a limited size for a buffer in which data gathered by the system 10 (FIG. 1) can be stored is provided. As mentioned above, the present invention facilitates viewing data collected by the system 10 (FIG. 1) in near real time and from a file. The user interface depicted in screen shot 950 facilitates setting the maximum size of the file to which event data can be written, and from which the event data can subsequently be viewed. An administrator may desire to save, for example, fifty megabytes of data. Thus, the user interface provides a file size selection area 960, operable to select the number of megabytes of data that will be saved. Restricting the amount of data to be collected can reduce the amount of memory, disk and processing time required to collect the data, thus making the present invention less intrusive than conventional monitoring systems.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for logging operating system events, comprising:
    a first memory for storing first data associated with an interrupt event;
    a second memory for storing second data associated with a non-interrupt event; one or more components for storing data in the first memory and the second memory;
    one or more components for moving the first data from the first memory to a third memory and the second data from the second memory to the third memory; and
    a first flushing component for flushing data from the third memory upon at least one of the third memory becoming substantially full and a timeout condition occurring.

2. The system of claim 1, wherein the one or more components for moving the first data from the first memory to the third memory move the first data upon execution of an event handler associated with handling the event being completed.

3. The system of claim 1, wherein the one or more components for moving the second data from the second memory to the third memory move the second data upon at least one of execution of an event handler associated with handling the event being completed and the second memory becoming substantially full.

4. The system of claim 1, wherein the one or more components for moving the first data and the second data are software processes.

5. The system of claim 1, wherein the first memory, the second memory and the third memory are located in a physical machine running an operating system being monitored.

6. The system of claim 5, wherein the third memory is a ring buffer stored in random access memory (RAM).

7. The system of claim 1, wherein the one or more components for moving the first data from the first memory and the second data from to second memory are hardware devices.

8. The system of claim 1, wherein the first memory, the second memory and the third memory are located in a physical machine not running an operating system being monitored.

9. The system of claim 1, further including a transporting component for transporting the data from the third memory, to facilitate display thereof, upon at least one of the third memory becoming full and/or a process timeout occurring.

10. The system of claim 1, wherein data stored in the third memory is moved from the third memory to one or more data communications devices.

11. The system of claim 1, wherein the data stored into third memory is arranged so that the first data associated with interrupt events and that the second data associated with non-interrupt events are in chronological order according to when the events were handled by the operating system.

12. The system of claim 1, further comprising a timer component operable to associate a time stamp with at least one of an interrupt event and a non-interrupt event.

13. The system of claim 1, wherein at least one of the first data in the first memory and to second data in the second memory includes a time stamp associated with when the event occurred.

14. The system of claim 1, wherein the non-interrupt events include user-defined events.

15. The system of claim 1, further comprising a user interface, the user interface operable to facilitate selecting one or more events to be logged.

16. The system of claim 1, further comprising an application programming interface (API) operable to facilitate selecting one or more events to be logged.

17. The system of claim 1, wherein the one or more components for moving the second data from the second memory to the third memory are further operable to determine that moving the second data from the second memory to the third memory did not complete successfully.

18. The system of claim 17, the one or more components for moving the second data from the second memory to the third memory further operable to retry moving the second data from the second memory to the third memory upon a determination that moving the second data from the second memory to the third memory did not complete successfully.

19. The system of claim 1, further comprising a viewing component for viewing data associated with one or more interrupt and non-interrupt events.

20. The system of claim 19, the viewing component operable to facilitate diagnosing problems associated with at least one of, an operating system, a device driver, and an application program.

21. The system of claim 19, the viewing component operable to run in at least one of a real time mode and a file displaying mode.

22. The system of claim 19, the viewing component operable to run in a limited buffer mode.

23. The system of claim 19, the viewing component operable to facilitate visualization of one or more time based thread interactions.

24. The system of claim 23, the viewing component thither operable to facilitate visualization of events associated with the one or more time based thread interactions.

25. The system of claim 19, the viewing component operable to facilitate selectively displaying N event types, N being an integer, from an available M event types, M being an integer greater than or equal to N.

26. The system of claim 19, the viewing component operable to facilitate searching for one or more events from the interrupt and non-interrupt events.

27. The system of claim 1, wherein the operating system being monitored runs on one or more embedded devices.

28. The system of claim 1, wherein the operating system being monitored is Windows CE.

29. A method for logging operating system kernel events, comprising:
  storing interrupt data associated with interrupt events in an interrupt buffer;
  storing non-interrupt data associated with non-interrupt events in a non-interrupt buffer;
  flushing the interrupt data to a secondary buffer; and
  flushing the non-interrupt data to the secondary buffer, wherein the non-interrupt data is flushed to the secondary buffer upon at least one of the non-interrupt buffer becoming substantially full and event handling associated with the non-interrupt event completing, the flushing not occurring during interrupt handling time.

30. The method of claim 29, wherein the interrupt data is flushed to the secondary buffer alter the interrupt processing completes and not during interrupt handling time.

31. The method of claim 29, further comprising flushing the secondary buffer upon at least one of the secondary buffer becoming substantially full and the occurrence of a time out condition, the flushing not occurring during interrupt handling time.

32. The method of claim 29, further comprising associating a Urns stamp with at least one of the interrupt data and the non-interrupt data.

33. The method of claim 29, wherein at least one of the interrupt events and the non-interrupt events are selectively logged.

34. The method of claim 33, wherein the interrupt and non-interrupt events to log are determined by at least one of choices made in response to a User Interface (UI) and one or more calls made to an Application Programming Interface (API).

35. The method of claim 29, further comprising, storing non-interrupt data associated with user-defined non-interrupt events in the non-interrupt buffer.

36. The method of claim 29, wherein flushing the non-interrupt data to the secondary buffer further comprises determining whether the flushing completes without interruption.

37. The method of claim 29, wherein flushing the non-interrupt data to the secondary buffer further comprises re-flushing the non-interrupt data to the secondary buffer upon a determination that the flushing did not complete without interruption.

38. The method of claim 29, further comprising controlling the a flow of events to an operating system.

39. The method of 38, further comprising generating an interrupt when the secondary buffer is substantially full.

40. The method of claim 29, further comprising displaying data associated with interrupt and non-interrupt events.

41. The method of claim 40, the data being displayed in at least one of a real time mode and a file displaying mode.

42. The method of claim 40, the data to be displayed being stored in a buffer of a ps-determined size, the size determinable by a user of the method.

43. The method of claim 29, wherein the operating system being monitored bans on one or more embedded devices.

44. The method of claim 29, wherein the operating system being monitored is Windows CE.

45. A computer readable medium storing computer executable components of a system for triple buffering information associated with events handled by an operating system kernel, comprising:
  one or more computer executable components for storing first data associated with interrupt events in a first memory;
  one or more computer executable components for storing second data associated with non-interrupt events in a second memory;
  one or more components for moving the first data from the first memory to the third memory and the second data from the second memory to a third memory; and
  a flushing component for flushing data from the third memory upon at least one of the third memory becoming substantially full and a timeout condition occurring, the flushing not occurring during interrupt handling time.

46. A computer readable medium storing computer executable instructions operable to execute a method for logging operating system kernel events, the method comprising:
  storing interrupt data associated with interrupt events in an interrupt buffer;
  storing non-interrupt data associated with non-interrupt events in a non-interrupt buffer;
  flushing the interrupt data to a secondary buffer, the flushing not occurring during interrupt handling time; and flushing the non-interrupt data to the secondary buffer, the flushing not occurring during interrupt handling time, and transporting data in the secondary buffer to facilitate display thereof, upon at least one of the secondary buffer becoming full and/or a process timeout occuring.

47. A data packet for logging operating system events adapted to be transmitted from a first system to a second system comprising:

at least one of interrupt data associated with interrupt events, the interrupt data being stored in a first memory; and at least one of non-interrupt data associated with non-interrupt events, the non-interrupt data being stored in a second memory, and a component for transporting data in the first memory and the second memory to facilitate display thereof, upon at least one of the first memory and the second memory becoming full and/or a process timeout occurring.

48. A system for logging operating system kernel events, comprising:

means for logging interrupt events to an interrupt buffer;

means for logging non-interrupt events to a non-interrupt buffer;

means for copying data in the interrupt buffer to a secondary buffer; and means for copying data in the non-interrupt buffer to the secondary buffer, and a means for transporting data in the first memory and the second memory to facilitate display thereof, upon at least one of the first memory and the second memory becoming full and/or a process timeout occurring.

49. The system of claim 48, further comprising means for viewing the contents of the secondary buffer.

50. The system of claim 48, further comprising means for choosing at least one of interrupt events and non-interrupt events to be logged.

51. The system of claim 48, further comprising means for time stamping events that are logged.

* * * * *